(12) United States Patent
Suzuki et al.

(10) Patent No.: US 7,139,482 B2
(45) Date of Patent: Nov. 21, 2006

(54) WAVELENGTH DIVISION MULTIPLEX TRANSMISSION SYSTEM

(75) Inventors: Mikiya Suzuki, Tokyo (JP); Katsuhiro Ishimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 782 days.

(21) Appl. No.: 09/824,643

(22) Filed: Apr. 4, 2001

(65) Prior Publication Data

US 2002/0005967 A1   Jan. 17, 2002

(30) Foreign Application Priority Data

Jul. 12, 2000   (JP) ............... 2000-211326

(51) Int. Cl.
*H04J 14/00* (2006.01)
(52) U.S. Cl. ............... 398/57; 398/2; 398/7; 398/25; 398/48; 398/49; 398/66
(58) Field of Classification Search ............ 398/2, 398/43, 57, 34, 79, 7, 25, 48, 49, 66
See application file for complete search history.

(56) References Cited

U.S. PATENT DOCUMENTS

| 5,949,563 | A  | * | 9/1999  | Takada ............... 398/7   |
| 5,995,256 | A  | * | 11/1999 | Fee ............... 398/34     |
| 6,404,522 | B1 | * | 6/2002  | Handelman ............... 398/79 |
| 6,466,985 | B1 | * | 10/2002 | Goyal et al. ............... 709/238 |
| 6,545,781 | B1 | * | 4/2003  | Chang et al. ............... 398/51 |
| 6,574,018 | B1 | * | 6/2003  | Handelman ............... 370/280 |

* cited by examiner

*Primary Examiner*—David C. Payne
(74) *Attorney, Agent, or Firm*—Venable; James R. Burdett

(57) ABSTRACT

There is provided a wavelength division multiplex transmission system with satisfactory transmission characteristics and extensive functions for avoidance of defects. Transmission signals to be transmitted by an optical transmission device are distributed among a plurality of wavelength components, converted into WDM signals, and sent to a WDM transmission network, and WDM signals from the WDM transmission network are restored to the transmission signals by an optical receiving device. This system includes a wavelength component-specific route setting device which sets routes for transmission on the WDM transmission network for each wavelength component.

22 Claims, 23 Drawing Sheets

WAVELENGTH DIVISION MULTIPLEX TRANSMISSION SYSTEM

BACKGROUND OF THE INVENTION

1. Field of the Invention

This invention concerns a wavelength division multiplex transmission system, and in particular routing control and defect processing.

2. Description of Related Art

Current trends in technology for increasing the capacity of optical communication systems can be broadly divided into time-division multiplex (TDM) methods, and wavelength-division multiplex (WDM) methods.

In WDM methods, signals are modulated at, for example, 10 Gbps per channel. In each channel, modulated signals at different wavelengths are superposed by a four-channel WDM optical coupler (wavelength division multiplexer), and by transmitting the resulting signal over a single optical fiber, transmission at 40 Gbps can be achieved. This WDM method has been described as being superior to the TDM method with respect to such areas as ease of upgrading, power division costs, security, and service flexibility.

In conventional systems using the WDM method, all the wavelength components of wavelength-multiplexed signals (WDM signals) have been transmitted on the same route up until the receiving end. However, in recent years there have also been numerous mesh-shape and ring-shape networks put into use which are provided with add-drop circuits (ADM, Add/Drop MUX) and cross-connect circuits (XC: cross-connect) in the WDM transmission path. In this case, an unlimited number of routes for selection, from transmission end to receiving end, can be supposed. However, all routes are different, due to the states of each route, including the number of intervening repeaters, the transmission distance, and traffic conditions on the route.

On the other hand, methods for selection of routes for transmission signals can be broadly divided into two types. In cases of end-to-end signaling-based control, for example, routes are allocated according to transmission distances (transmission path distances). In cases of IP-based routing control, for example, routes are allocated according to the number of hops until the receiving end, regardless of the transmission distance. For example, as shown in FIG. 1, when, as routes between the repeater node N1 and the repeater node N2, there is a route RT1 with a large number of hops and short transmission distance and a route RT2 with a small number of hops and long transmission distance, if selecting the route according to transmission distance the route RT1 is selected, whereas if selecting the route according to number of hops the route RT2 is selected. In either case, the same route, RT1 or RT2, is selected for all wavelength components.

However, route selection methods in conventional WDM systems have been route selection methods the selection criteria of which do not reflect important factors influencing transmission quality, such as the number of repeaters or traffic conditions.

For example, in the case of a method for route selection according to transmission distance (transmission path distance), routes are allocated solely on the basis of transmission distance, unrelated to the number of repeating switches or the traffic conditions within the transmission band. If a transmission distance is short, that route (transmission path) will be selected, no matter how many network elements (NEs) exist in the path, or how bad the characteristics are. The greater the increased number of optical amplifiers, optical switches, optical filters and other NEs existing in a network, even if as unit components they have only very small wavelength dependences, these wavelength dependences will accumulate, and the result for the entire route cannot be neglected.

In the case of methods for route selection according to number of hops also, the optical S/N ratio, used band capacity and other factors are not considered. Hence in this case also, the selected route is not necessarily optimal with respect to the transmission characteristics of optical signals. A route is selected on the basis of cost considerations alone.

Further, whichever route selection method is used, if the same route is selected for a number of data sets, a large amount of data is concentrated in a given route to result in congestion, and problems such as circuit breaks may occur. In addition, if a malfunction occurs in an NE on the transmission route, another route is used in place of that transmission route, and consequently the tendency toward congestion in the WDM transmission network is intensified, giving rise to the problem that the probability of circuit breaks is increased.

As explained above, conventional route selection methods are not suitable from the standpoint of securing transmission quality.

In particular, when a defect occurs and routes are reallocated, in extreme cases, large amounts of empty band capacity may occur in a certain route. However, even in such cases this route may not be selected by the above-described conventional route selection methods, and consequently data may be concentrated in one particular route or a plurality of routes. That is, there is the possibility that an empty route may not be selected, because the transmission distance is long or the number of hops is large.

Further, in conventional route selection methods in which data is concentrated in a given route, if a currently utilized route is cut off, route switching is necessary for a large amount of data at once, and this may be the cause of a higher probability of congestion.

Even in cases in which the optical transmission device transmitting WDM signals and the optical receiving device receiving WDM signals comprise an operation system and standby system, the same route is adopted by the operation system and by the standby system, so that the above-described problem with route selection methods cannot be resolved. In this case, only defects within the operation system of the optical transmission device and optical receiving device can be accommodated.

SUMMARY OF THE INVENTION

This invention was devised in consideration of the above problems, and provides a wavelength division multiplex transmission system with satisfactory transmission characteristics, and which has enhanced functions for defect avoidance.

In order to resolve the problems described, the wavelength division multiplex transmission system of this invention comprises an optical transmission device which distributes the transmission signals to be transmitted among a plurality of wavelength components and converts the signals into WDM signals, and an optical receiving device to convert WDM signals from the WDM transmission network transmitting these WDM signals into the above mentioned transmission signals. This system has a wavelength component-specific route setting device for each of the above mentioned wavelength components, to set the route for transmission over the abovementioned WDM transmission network.

BRIEF DESCRIPTION OF THE DRAWINGS

The forgoing and other objects, features and advantages of the present invention will be better understood from the following description taken in connection with accompanying drawings, in which.

DESCRIPTION OF THE PREFERRED EMBODIMENTS (A) First Embodiment

With reference to the drawings, a detailed description of a first embodiment of the wavelength division multiplex transmission system according to the present invention will be herehinafter given.

(A-1) Configuration of First Embodiment

Figure 1:
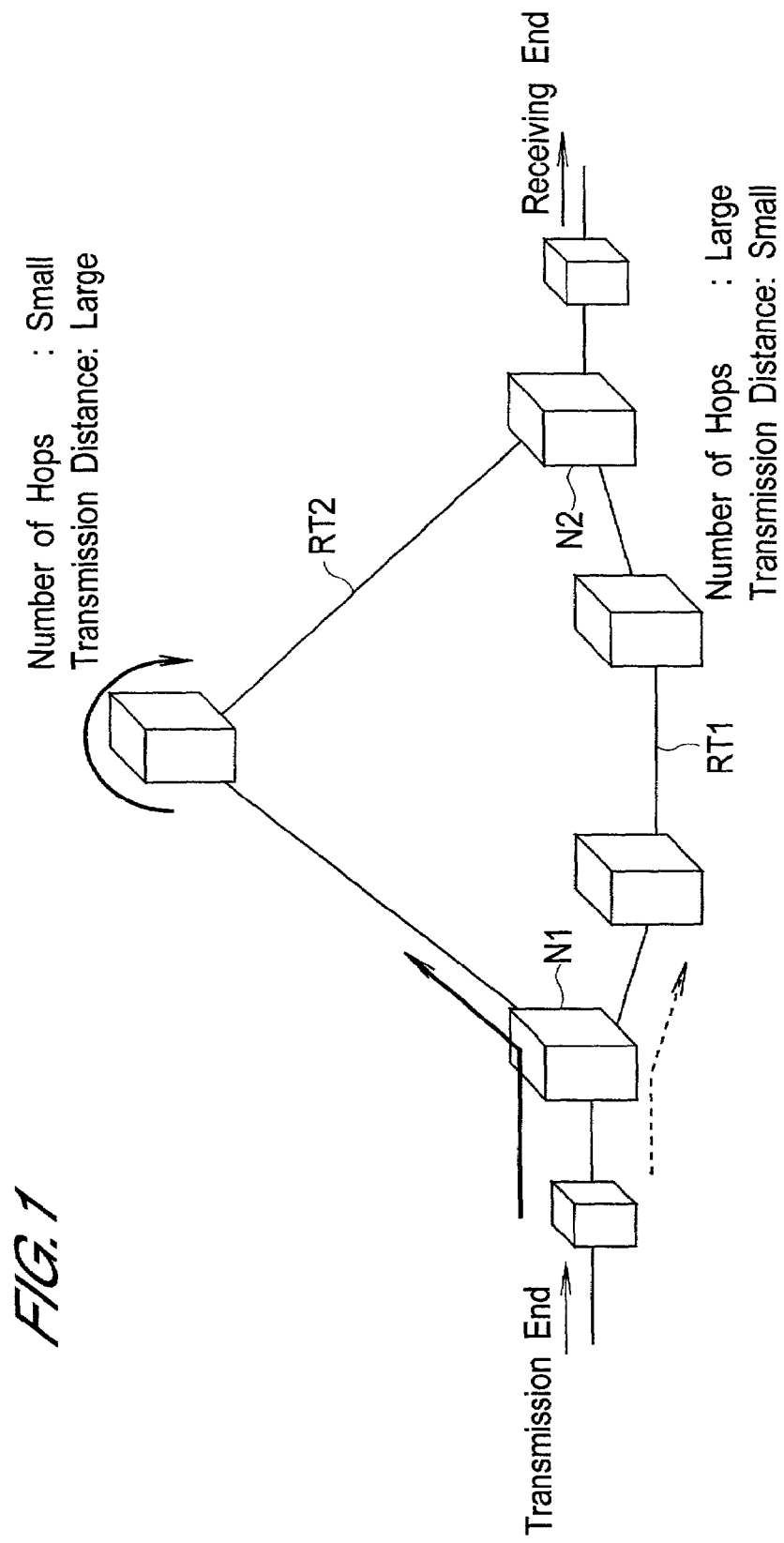
FIG. 1 is a figure explaining problems of the conventional technology.
Figure 2:
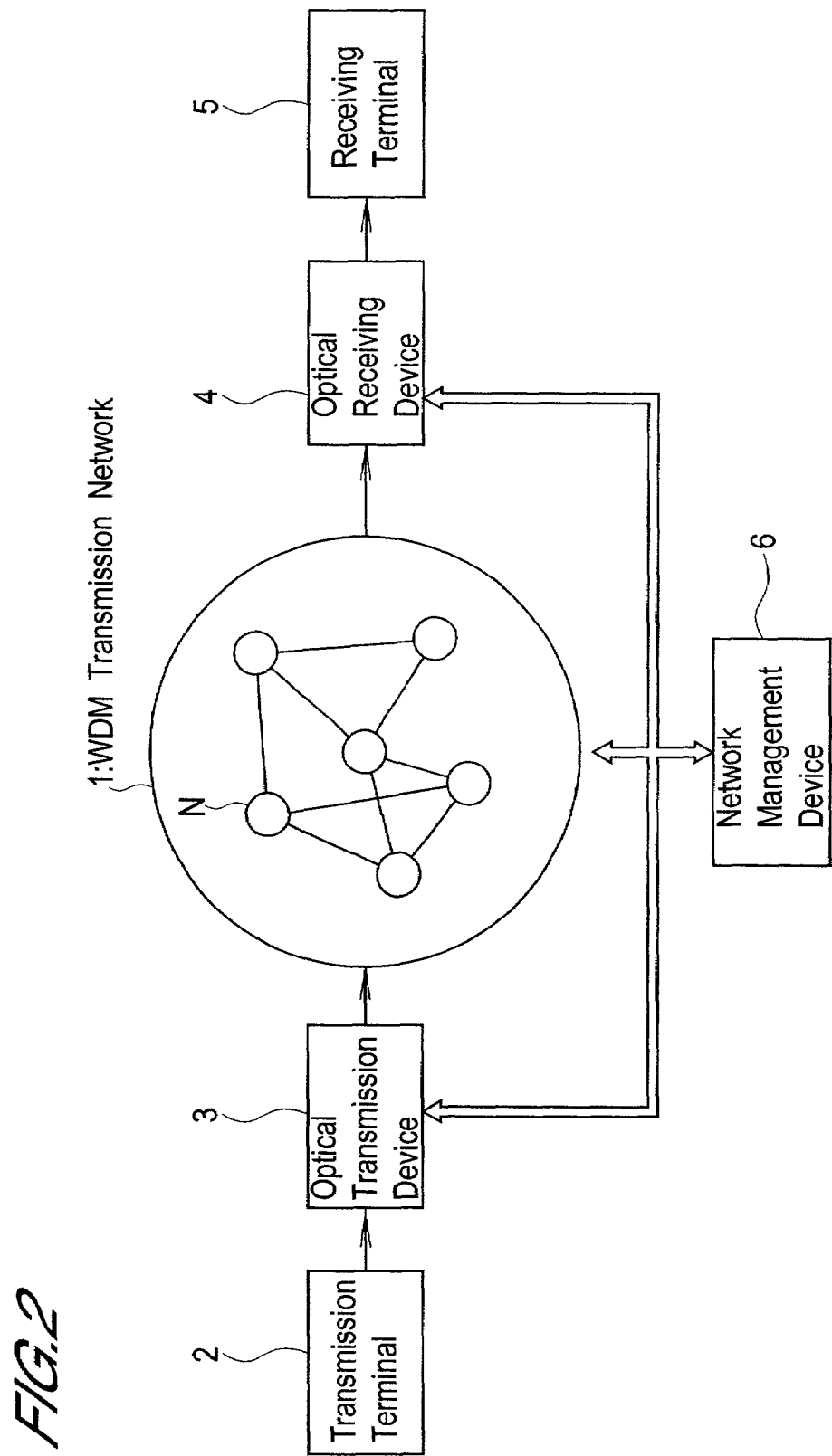
FIG. 2 is a block diagram showing the system configuration of a first embodiment of the wavelength division multiplex transmission system of this invention.

Referring to FIG. 2, the wavelength division multiplex transmission system of the first embodiment has a WDM transmission network 1; an optical transmission device 3 which converts transmission signals (electrical signals) from a transmission terminal 2 into optical signals (WDM signals) and transmits the optical signals over the WDM transmission network; an optical receiving device 4 which changes WDM signals received from the WDM transmission network 1 into electrical signals and applies the electrical signals to the receiving terminal 5; and a network management device 6 which is responsible for management functions for the WDM transmission network 1, optical transmission device 3, optical receiving device 4, and similar.

(A-1-1) WDM Transmission Network 1

In the WDM transmission network 1, a plurality of nodes N are connected in, for example, a mesh shape or a matrix shape. Here, the wavelength components handled by the WDM transmission network 1 are assumed to be a plurality of discrete wavelengths, $\lambda 1$ to $\lambda n$, extending from a short-wavelength end to a long-wavelength end. In this first embodiment, the internal configuration of each node N is omitted from the figure, but a WDM signal input from a given node can be exchanged (or switched) and output for each wavelength component.

Figure 3:
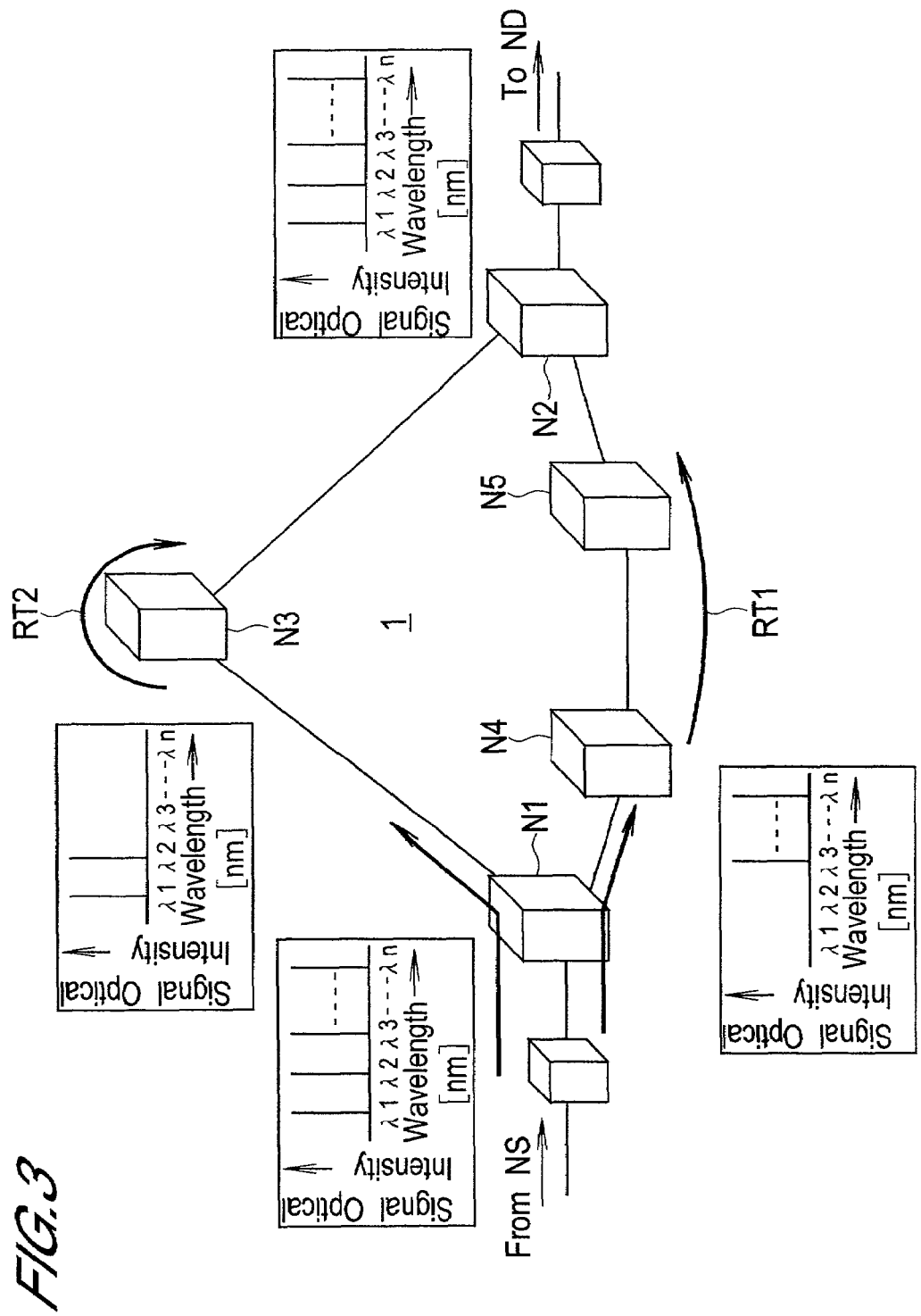
FIG. 3 is a figure explaining exchange processing of nodes in the WDM transmission network of the first embodiment of the wavelength division multiplex transmission system of this invention.

FIG. 3 is an explanatory figure illustrating transmission on different routes according to the wavelength component.

In the configuration example shown in FIG. 3, when a node N1 is provided with a WDM signal containing all the wavelength components from $\lambda 1$ to $\lambda n$ from a certain node NS (not shown; this may also be an optical transmission device), a WDM signal containing wavelength components λ1 and λ2 is applied to node N3, and a WDM signal containing the wavelength components λ3 to λn is applied to node N4.

When a WDM signal containing wavelength components λ1 and λ2 is applied to node N3 from node N1, node N3 applies a WDM signal containing wavelength components λ1 and λ2 to node N2. When a WDM signal containing wavelength components λ1 and λ2 is applied to node N3 from a node (not shown) other than node N1, a WDM signal containing wavelength components λ1 and/or λ2 can be applied to a node (not shown) other than node N2. Explanation of exchange functions for the other wavelength components λ3 to λn of node N3 is omitted.

Similarly, nodes N4 and N5 have, at least, the exchange functions shown in FIG. 3 with respect to WDM signals containing the wavelength components λ3 to λn.

When a WDN signal containing wavelength components λ1 and λ2 is applied to node 2 from node N3, node N2 applies to node ND (not shown; may also be an optical receiving device) a WDM signal containing wavelength components λ1 and λ2, and when a WDM signal containing wavelength components λ3 to λn is applied to node 2 from node N5, node N2 applies to node ND a WDM signal containing wavelength components λ3 to λn.

That is, FIG. 3 shows an example in which, when sending a WDM signal containing all the wavelength components from λ1 to λn An from the node NS to the node ND, by means of the route exchange functions (exchange functions for each wavelength component) of the WDM transmission network 1, the wavelength components λ1 and λ2 are transmitted via the route RT2, and the wavelength components λ3 to λn are transmitted via the route RT1.

The above-described exchange processing for each wavelength component at each node may, for example, rely on labeling information, inserted into the optical signals for each wavelength component (for example, the header part), which indicates routes. Or, exchange processing may rely on control signals from the network management device 6.

(A-1-2) Optical Transmission Device 3

Figure 4:
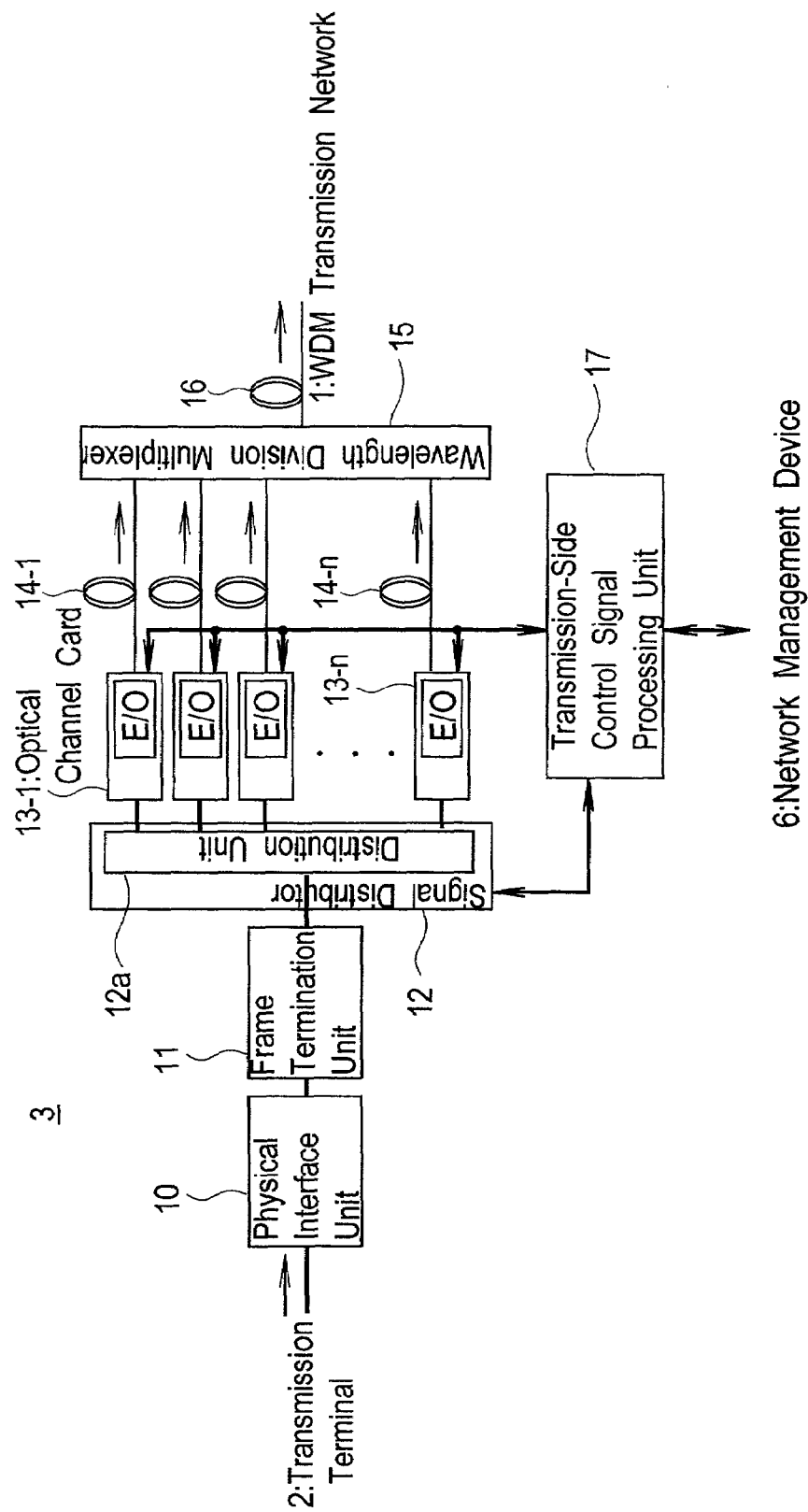
FIG. 4 is a block diagram showing the detailed configuration of the optical transmission device of the first embodiment of the wavelength division multiplex transmission system of this invention.

FIG. 4 is a block diagram showing the detailed configuration of the optical transmission device 3. In FIG. 4, signal lines for electrical signals are shown as thick lines, and signal lines for optical signals are shown as thin lines.

In FIG. 4, the optical transmission device 3 has a physical interface unit 10, frame termination unit 11, signal distributor 12, optical channel cards 13-1 through 13-n, wavelength division multiplexer 15, transmission-side control signal processing unit 17, and other components.

The physical interface unit 10 is responsible for physical interface functions with the transmission terminal 2. The frame termination unit 11 performs termination processing for transmission signals (transmission frames) from the transmission terminal 2.

FIG. 4 shows the case in which one transmission terminal 2 is connected to the optical transmission device 3. When there is a plurality of transmission terminals 2, a physical interface unit 10 and frame termination unit 11 are provided at each transmission terminal 2. Selection of transmission signals from each transmission terminal 2 may be performed by providing selection switches, or the signal distributor 12 may be endowed with these functions. Here the transmission terminals 2 need not be ordinary communication terminals, but may also be routers or similar.

The signal distributor 12 has functions for distributing transmission signals from transmission terminals 2 to the optical channel cards 13-1 to 13-n, as optical channel units. In the case of a train of packet signals P1 to Pn, for n transmission signals from a transmission terminal 2, the signal distributor 12 distributes the packet signal P1 to the optical channel card 13-1, the packet signal P2 to the optical channel card 13-2, the packet signal P3 to the optical channel card 13-3, and so on, until the packet signal Pn is distributed to the optical channel card 13-n. A plurality of packet signals may also be distributed to the same channel card. Such a distribution method relies upon control information from the transmission-side control signal processing unit 17.

The signal distributor conforms to, for example, IMP (Inverse MUX for Packets (over SONET/SDH)).

The signal distributor 12 comprises a distribution unit 12a which actually executes distribution of signals, and a distribution control signal receiving unit (omitted in FIG. 4) which receives distribution control signals from the transmission-side control signal processing unit 17, and applies the signals to the distribution unit 12a. By this means, the signal distributor 12 distributes and applies to the optical channel cards 13-1 to 13-n the transmission signals from the transmission terminals 2, according to distribution control signals from the transmission-side control signal processing unit 17.

The first principal function of each of the optical channel cards 13-1, . . . , 13-n is electrical/optical conversion. A different wavelength λ1, . . . , λn is allocated to each of the optical channel cards 13-1, . . . , 13-n. Each of the optical channel cards 13-1, . . . , 13-n converts electrical signals (distributed transmission signals) applied from the signal distributor 12 into optical signals for the wavelength component λ1, . . . , λn allocated to that card, and applies the optical signal to the wavelength division multiplexer 15 via the corresponding optical fiber 14-1, . . . , 14-n.

The wavelength division multiplexer 15 comprises, for example, an n:1 optical coupler; it performs wavelength multiplexing of the optical signals for each of the arriving wavelength components λ1 to λn, and sends the WDM signals to an optical fiber 16 leading to the WDM transmission network 1.

As explained above, in the WDM transmission network 1, routes can be changed according to the wavelength component λ1, . . . , λn.

The second principal function of each of the optical channel cards 13-1, . . . , 13-n is to send evaluation signals to evaluate routes for each wavelength component in the WDM transmission network 1. Each of the optical channel cards 13-1, . . . , 13-n sends an evaluation signal under the control of the transmission-side control signal processing unit 17, notifies the transmission side control signal processing unit 17 of the timing with which evaluation signals are sent, and performs other operations. Specifically,each of the optical channel cards 13-1, . . . , 13-n constitutes an optical channel unit.

The transmission-side control signal processing unit 17 is connected to the network management device 6. This processing unit 17 has functions for, for example, specifying the details of distribution by the signal distributor 12, and controlling the sending of evaluation signals from each of the optical channel cards 13-1, . . . , 13-n. While a detailed discussion is omitted, the transmission-side control signal processing unit 17 is also responsible for monitoring of each of the optical channel cards 13-1, . . . , 13-n, and when a malfunction occurs in any of the optical channel cards, notifies the network management device 6 or similar of this malfunction.

Figure 5:
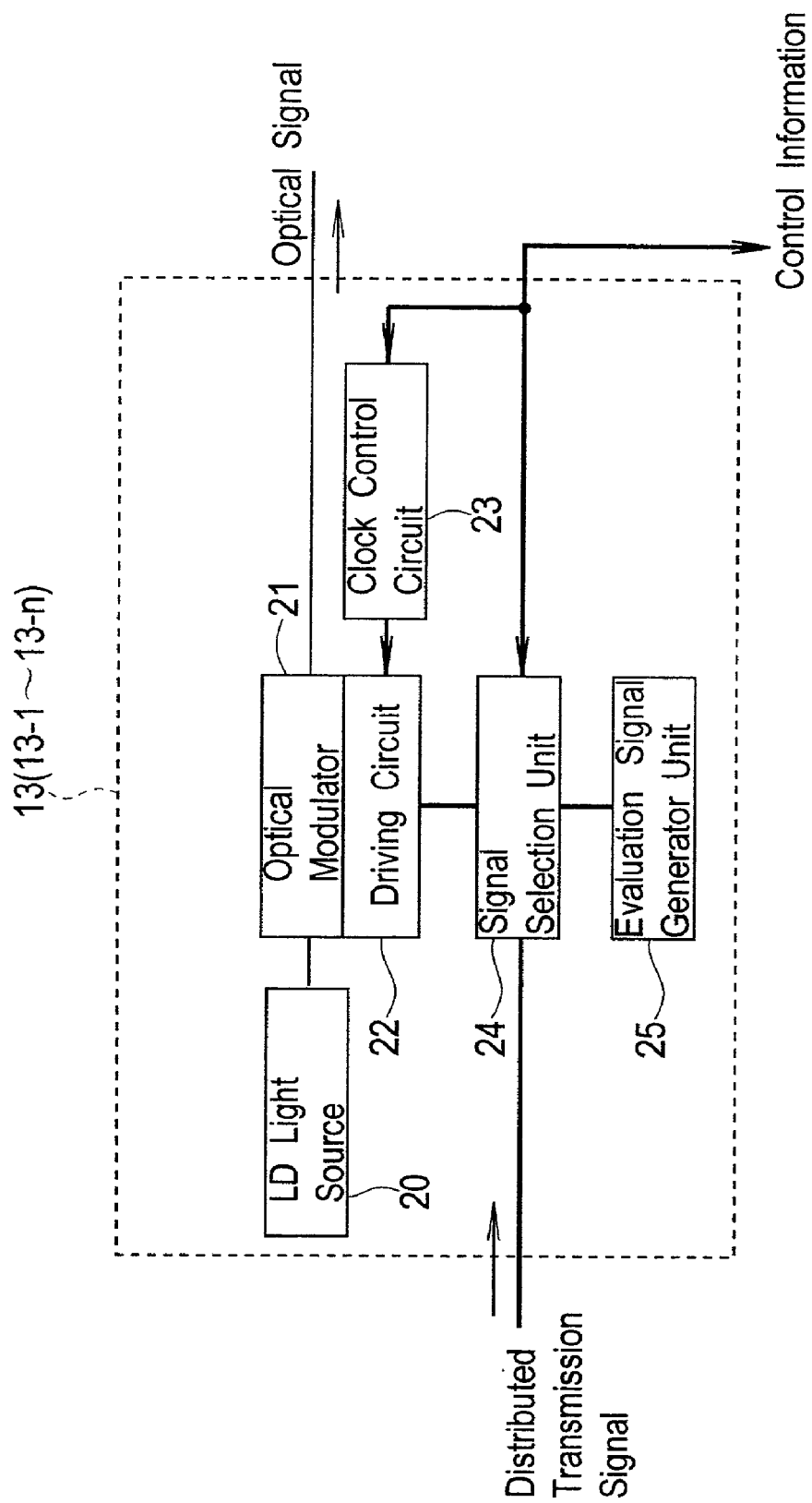
FIG. 5 is a block diagram showing the detailed configuration of an optical channel card of the first embodiment of this invention.

FIG. 5 is a block diagram showing the detailed configuration of the optical channel cards 13 (13-1, . . . , 13-n). In FIG. 5 also, signal lines for electrical signals are shown as thick lines, and signal lines for optical signals are shown as thin lines.

The optical channel cards 13 have an LD (laser diode) light source 20; an optical modulator 21; a modulator driver circuit (in FIG. 5, denoted as a driver circuit) 22; a clock control circuit 23; a signal selection unit 24; and an evaluation signal generator unit 25.

Here, the LD light source 20, optical modulator 21 and modulator driver circuit 22 are configured in order to convert ordinary electrical signals into optical signals. That is, the modulator driver circuit 22 drives the optical modulator 21 according to the electrical signal to be transmitted, and based on the clock frequency specified by the clock control circuit 23, to modulate (for example, intensity modulation) optical signals (with the wavelength allocated to the optical channel card 13) from the LD light source 20, to output modulated optical signals. Of course a modulated light source, in which the light source is directly controlled for modulation, can also be employed.

In the case of this first embodiment, the optical channel card 13 has a clock control circuit 23, signal selection unit 24, and evaluation signal generator unit 25.

The evaluation signal generator unit 25 generates an evaluation signal (electrical signal) for evaluation of the route and its transmission characteristics of the wavelength component of the optical channel card 13 in the WDM transmission network 1, under the control of the signal selection unit 24. The data pattern of evaluation signals is a pattern enabling discrimination from distributed transmission signals. Here the transmission timing is such that evaluation signals and distributed transmission signals are temporally differentiated. Further, the optical channel cards 31-1, . . . , 13-n shown in FIG. 4, and more specifically, the evaluation signal generator unit 25 shown in FIG. 5 is a constituent component of the transmission characteristic evaluation means.

Distributed transmission signals (electrical signals) are applied from the signal distributor 12 to the signal selection unit 24, which at the same time is connected to the evaluation signal generator unit 25. During intervals in which distributed transmission signals are applied by the signal distributor 12 according to control signals from the transmission-side control signal processing unit 17, the signal selection unit 24 selects the distributed transmission signal and applies it to the modulator driver circuit 22; during intervals in which distributed transmission signals are not applied by the signal distributor 12, the signal selection unit 24 causes the evaluation signal generator 25 to generate evaluation signals, which are applied to the modulator driver circuit 22.

That is, whereas distributed transmission signals (optical signals) having the allocated wavelength components are sometimes sent from the optical channel card 13, evaluation signals (optical signals) having the allocated wavelength components are also sometimes sent.

In the case of this first embodiment, the period of the clock signal output by the above-described clock control circuit 23 of the optical channel card 13 can be varied by the network management device 6 (directly by the control signal processing unit 17). That is, transmission speeds can be switched.

(A-1-3) Optical Receiving Device 4

Figure 6:
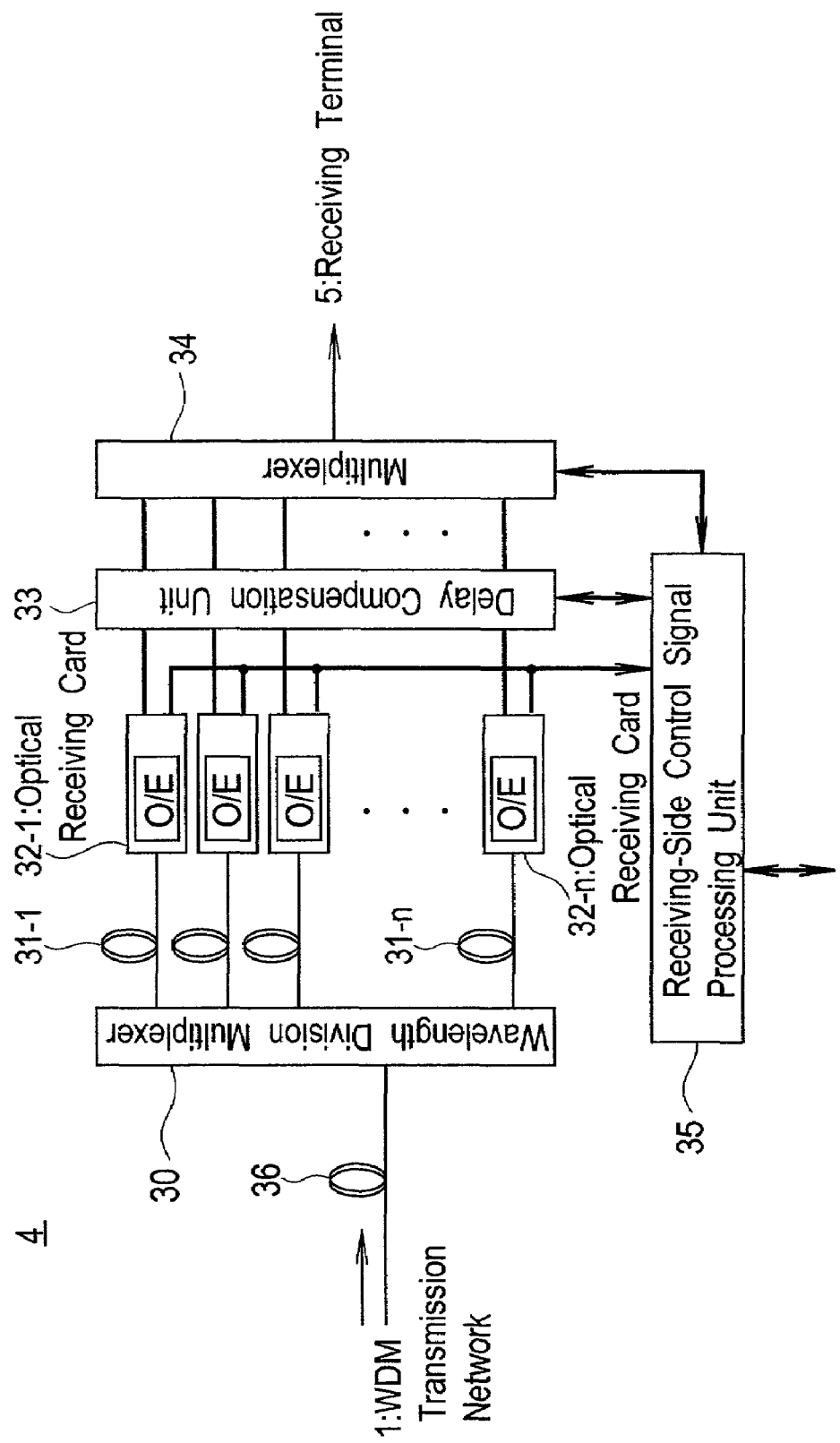
FIG. 6 is a block diagram showing the detailed configuration of the optical receiving device of the first embodiment of this invention.

FIG. 6 is a block diagram showing the detailed configuration of the optical receiving device 4. In FIG. 6, signal lines for electrical signals are shown as thick lines, and signal lines for optical signals are shown as thin lines.

In FIG. 6, the optical receiving device 4 has a wavelength division demultiplexer 30, optical receiving cards 32-1 to 32-n, delay compensation unit 33, multiplexer 34, receiving-side control signal processing unit 35, and other components.

WDM signals arriving from the WDM transmission network 1 via the optical fiber 36 are input to the wavelength division demultiplexer 30 of the optical receiving device 4. The wavelength division demultiplexer 30 separates the arriving WDM signal into wavelength components λ1, . . . , λn, and applies the optical signals of each of the wavelength components λ1, . . . , λn to corresponding optical receiving cards 32-1, . . . , 32-n, as optical receiving units, via optical fibers 31-1, . . . , 31-n.

The detailed configuration of each of the optical receiving cards 32-1, . . . , 32-n is omitted from the figure; but after converting the optical signals of the wavelength components λ1, . . . , λn allocated to each card into electrical signals, discrimination is performed to determine whether these electrical signals are distributed transmission signals or evaluation signals. When arriving signals are distributed transmission signals, each of the optical receiving cards 32-1, . . . , 32-n applies these distributed transmission signals to the delay compensation unit 33. When arriving signals are evaluation signals, each of the optical receiving cards 32-1, . . . , 32-n obtains evaluation information and applies this information to the receiving-side control signal processing unit 35. As evaluation information, for example, the bit error rate (BER) can be employed. This bit error rate indirectly reflects the optical S/N ratio of the WDM transmission network. Instead of using the bit error rate as evaluation information, the evaluation signal may be subjected to waveform analysis in the state of optical signals, to directly obtain the optical S/N ratio. Specifically, each of the optical receiving cards 32-1, . . . , 32-n constitutes an optical receiving unit.

Each of the optical receiving cards 32-1, . . . , 32-n may also apply the evaluation signals themselves to the receiving-side control signal processing unit 35, so that the receiving-side control signal processing unit 35 obtains evaluation information.

The delay compensation unit 33 compensates each of the input distributed transmission signals (electrical signals) for transmission delay based on differences in transmission routes in the WDM transmission network 1 for each wavelength component λ1, . . . , λn, and applies the result to the multiplexer 34. Information on the compensated transmission delay time may be obtained from the receiving-side control signal processing unit 35, or may be received autonomously by the delay compensation unit 33 according to header or other information.

The multiplexer 34 multiplexes the input plurality of distributed transmission signals, and returns these signals to the transmission signal which was to be transmitted by the optical transmission device 3. Thereafter, this transmission signal is sent to a receiving terminal 5 by means of an interface circuit with the receiving terminal 5 or similar, not shown. Specifically, the optical receiving cards 32-1, . . . , 32-n of FIG. 6, or, the receiving-side control signal processing unit 35, are constituent components of the transmission characteristic evaluation means.

The receiving-side control signal processing unit 35 is connected to the network management device 6. This processing unit 35 provides evaluation information to the network management device 6, controls the quantity of delay information for each wavelength component λ1, ..., λn in the delay compensation unit 33 based on route setting information from the network management device 6, controls the multiplexing method used by the multiplexer 34 (to accommodate signal distribution on the side of the optical transmission device 3), and performs other operations. If there are wavelength components not used in the current communication, operation of the corresponding optical receiving cards may be prohibited, so as to suppress unnecessary power dissipation.

The receiving-side control signal processing unit 35 also monitors the occurrence of defects in each of the optical receiving cards 32-1, ..., 32-n. If a defect occurs in any of the optical receiving cards, the network management device 6 is notified of this fact.

(A-1-4) Network Management Device 6

Figure 7:
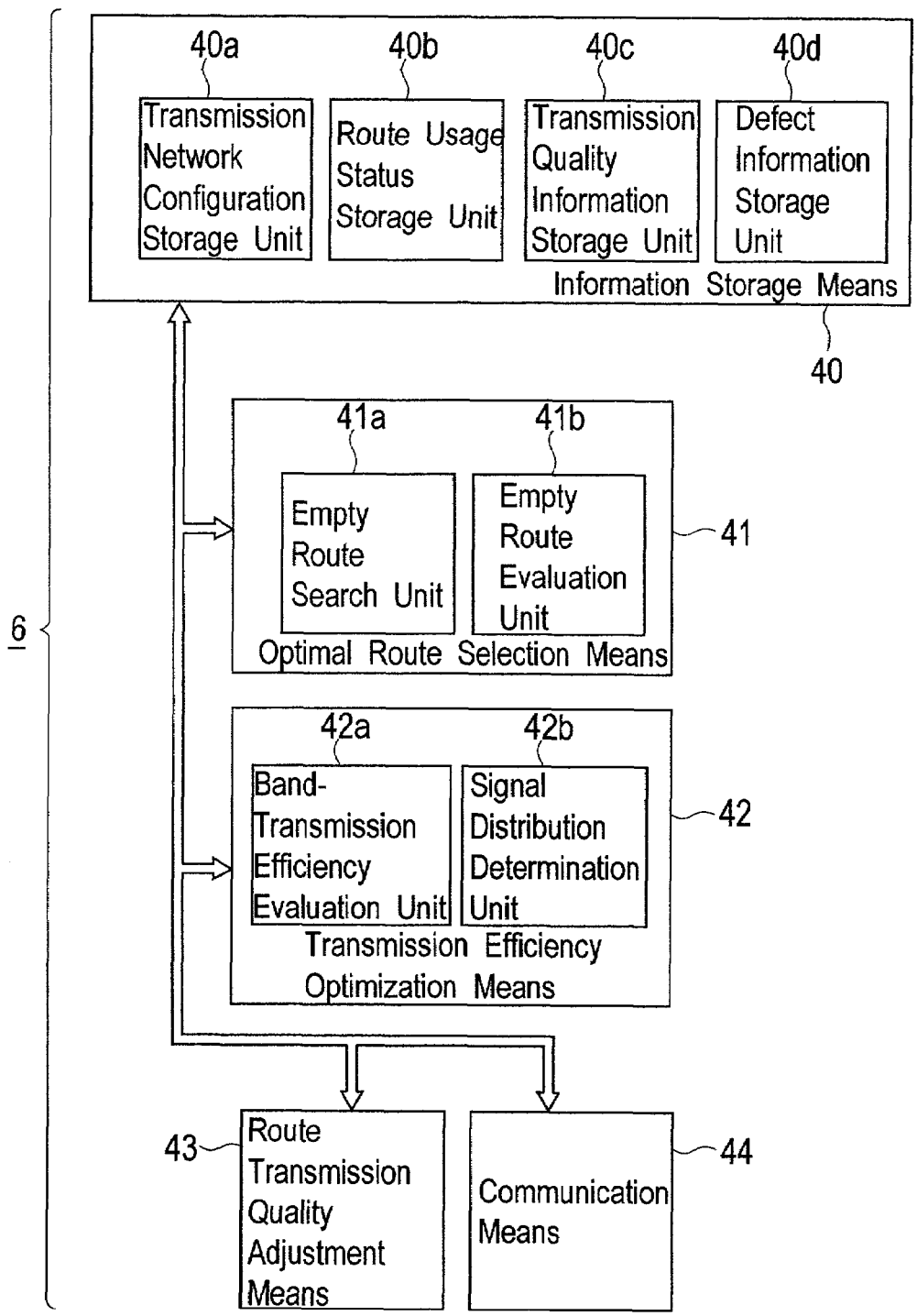
FIG. 7 is a block diagram showing the functional detailed configuration of the network management device of the first embodiment of this invention.

FIG. 7 is a block diagram showing the functional configuration of the network management device 6. The network management device 6 may, for example, comprise information processing devices centered on a CPU which executes software; but the configuration shown in FIG. 7 can also be employed, to implement functions for rerouting based on initial use, an NE malfunction, or at other times. The functions of each part are also clear from an explanation of operation, and so are briefly explained here.

In FIG. 7, the network management device 6 has, as principal components, information storage means 40, optimal route selection means 41, transmission efficiency optimization means 42, route transmission quality adjustment means 43, and communication means 44. The network management device 6, including, specifically, the principal components, operates as a wavelength component-specific route setting device.

The information storage means 40 has a transmission it network configuration storage unit 40a, route usage status storage unit 40b, transmission quality information storage unit 40c, and defect information storage unit 40d, and other components.

The transmission network configuration storage unit 40a stores information on the configuration itself of the WDM transmission network 1. The unit stores information on nodes comprised by the network (including information on exchange functions for each of the wavelength components λ1, ..., λn), and information on optical fibers (physical paths) connecting nodes.

The route usage status storage unit 40b stores information on routes for each wavelength component λ1, ..., λn currently in use and on empty band capacity and other information for the routes of each wavelength component λ1, ..., λn, associated with network configurations of the WDM transmission network 1.

The transmission quality information storage unit 40c stores evaluation information for the routes described above, and other information on transmission quality.

The defect information storage unit 40d stores defect information for repeater nodes, optical fibers, and other network elements (NEs) in the WDM transmission network 1, as well as defect information for optical channel cards 13 in the optical transmission device 3 and optical receiving cards 32 (32-1 to 32-n) in the optical receiving device 4, and similar information.

The optimal route selection means 41 has an empty route search unit 41a and empty route evaluation unit 41b.

The empty route search unit 41a searches for an empty route (in actuality, often a plurality exist) for each wavelength component λ1, ..., λn, connecting the optical transmission device 3 and optical receiving device 4 which are the objects of routing. Here, the information stored by the transmission network configuration storage unit 40a and route usage status storage unit 40b, and other information, is referenced. Routes containing as elements NEs for which defects are stored in the defect information storage unit 40d are excluded from the search.

For wavelength components for which not even one empty route is found, the empty route evaluation unit 41b notifies the transmission efficiency optimization means 42 that there are no optimal routes; for wavelength components for which a single empty route is found, the empty route evaluation unit 41b notifies the transmission efficiency optimization means 42 that that empty route is the optimal route; and for wavelength components for which two or more empty routes are found, the empty route evaluation unit 41b evaluates those empty routes, determines an optimal route, and notifies the transmission efficiency optimization means 42.

As necessary, the empty route evaluation unit 41b also evaluates optimal routes for each wavelength component.

In order to determine the optimal route from a plurality of empty routes, evaluation signals are transmitted via each of the empty routes, and the optimal route is determined as the route for which the evaluation values, propagation time, and other transmission characteristics captured by the optical receiving device 4 are best. While differing from the explanation of operation given below, the optimal route may also be determined based on evaluate values captured, propagation times, and other information from the past (as recent as possible). When numerous empty routes have been found, the optimal route may be determined based on evaluation values, propagation times, and other information after first reducing the number of candidates on the basis of transmission distance, number of hops, or other criteria (that is, the transmission distance, number of hops, and other acceptance conditions may be imposed to reduce in advance the number of empty routes found). When there is a plurality of best empty routes, the optimal route may be determined based on the transmission distance, number of hops, or other criteria.

The transmission efficiency optimization means 42 has a band-transmission efficiency evaluation unit 42a, a signal distribution determination unit 42b, and other components. The band-transmission efficiency evaluation unit 42a and signal distribution determination unit 42b coordinate to constantly revise the details of distribution of transmission signals to each of the optical channel cards 13-1, ..., 13-n. In this embodiment of the invention, as described in the section on operation, the transmission efficiency optimization means 42 functions during transmission of transmission signals. Prior to the beginning of transmission of transmission signals, the transmission efficiency optimization means 42 may evaluate the used band capacity and transmission efficiency, and determine the method of distribution of the transmission signals. The transmission efficiency may, for example, be a parameter which is higher when used band capacities are balanced for each route, and lower when used band capacities are in imbalance for each route.

In this first embodiment, in essence the inverse-multiplex method is considered, so that when an optimal route is obtained for wavelength components for the necessary number of channels or greater (if p shows number of channels, then p ≦n), the transmission efficiency optimization means 42 makes a determination such that the transmission signal is distributed to p optical channel cards. In this determination, it is desirable, with respect to the transmission efficiency, that selection be performed from the wavelength components with greater empty band capacity, taking propagation delay into consideration.

The necessary number of channels p is, for example, the value obtained by dividing the amount of data of the transmission signal by the amount of data which can be handled in one transmission operation by each of the optical channel cards $13\text{-}1, \ldots, 13\text{-}n$ (the amount of data that can be accumulated in the buffer (not shown) within the optical channel card).

The route transmission quality adjustment means 43 mainly monitors the transmission quality (for example, the above-described evaluation information) for each route during transmission of transmission signals, and if the transmission quality drops, lengthens the clock signal period of the optical channel cards $13\text{-}1, \ldots, 13\text{-}n$ and otherwise tries to secure the minimum level of transmission quality. This monitoring of transmission quality is performed for, for example, wavelength components with little empty band capacity. Specifically, the route transmission quality adjustment means 43 of FIG. 7 constitutes the transmission quality management means.

The communication means 44 executes communication of control information between the optical transmission device 3, optical receiving device 4, and other components.

(A-2) Operation of the First Embodiment

Next, each type of operation of the wavelength division multiplex system of the first embodiment of this invention, having the configuration described above, is explained.

(A-2-1) Basic Transmission Operation

When a transmission signal is input to the optical transmission device 3 from a transmission terminal 2, the transmission signal is distributed among each of the wavelength components $\lambda A, \ldots, \lambda n$ according to the distribution details (distribution method) set by the signal distributor 12. The distributed transmission signals (electrical signals) are converted into optical signals at prescribed respective wavelengths $\lambda 1, \ldots, \lambda n$ in each of the optical channel cards $13\text{-}1, \ldots, 13\text{-}n$, and thereafter are wavelength-multiplexed in the wavelength division multiplexer 15, and the WDM signal is sent to the WDM transmission network 1.

In the WDM transmission network 1, the WDM signal output from the optical transmission device 3 arrives at the opposing optical receiving device 4, via the routes set for each of the wavelength components $\lambda 1, \ldots, \lambda n$.

In the optical receiving device 4, an arriving WDM signal is demultiplexed into optical signals with the wavelength components $\lambda 1, \ldots, \lambda n$, respectively, by the wavelength division demultiplexer 30, and the optical signals of the wavelength components $\lambda 1, \ldots, \lambda n$ are applied to the corresponding optical receiving cards $32\text{-}1, \ldots, 32\text{-}n$, respectively. Each of the optical receiving cards $32\text{-}1, \ldots, 32\text{-}n$ converts the optical signal for each of the wavelength component $\lambda 1, \ldots, \lambda n$ allocated to it into an electrical signal. After conversion, the delay compensation unit 33 compensates the electrical signals corresponding to each of the wavelength components for propagation delays due to differences in the routes of each of the wavelength components $\lambda 1, \ldots, \lambda n$; the result is then multiplexed by an electrical multiplexer 34, and the transmission signal to be transmitted by the optical transmission device 3 is regenerated and sent to a receiving terminal 5.

(A-2-2) Initial Route Selection Operation

Figure 8:
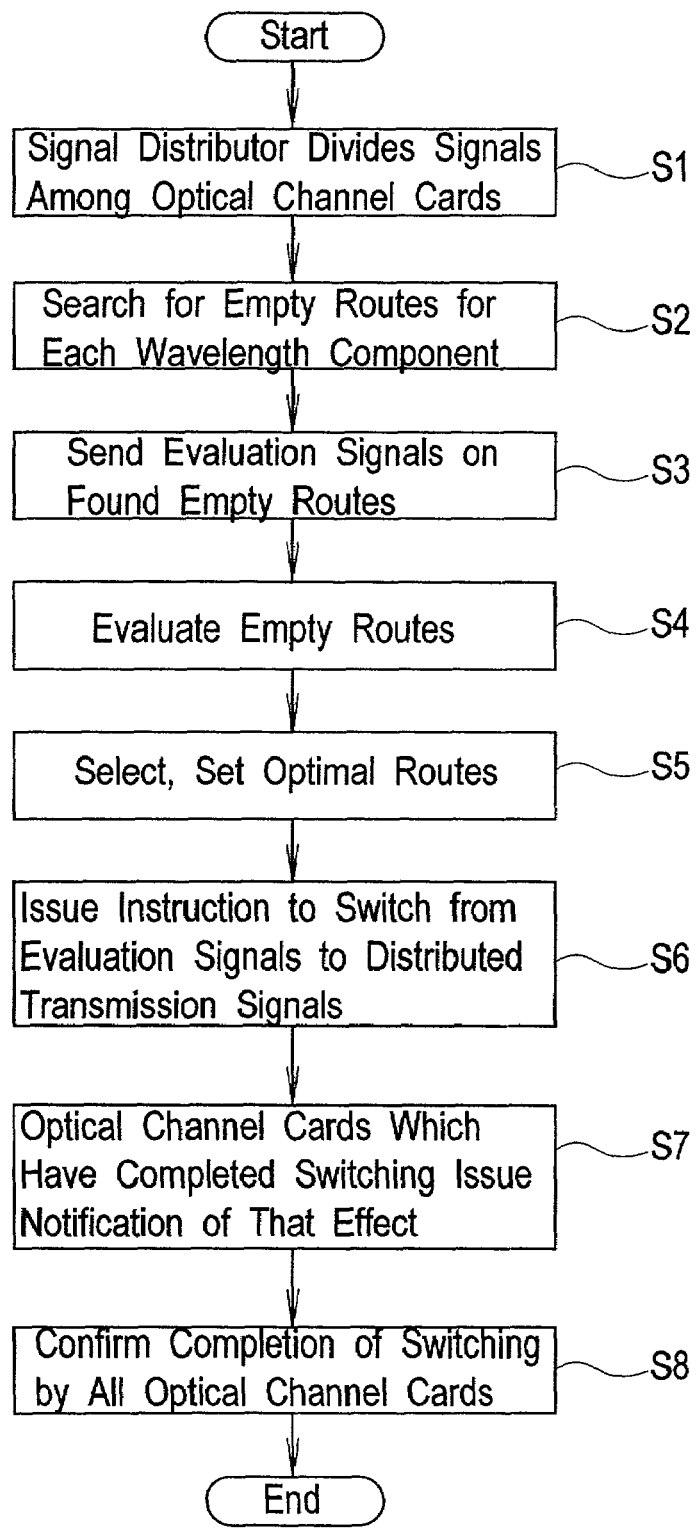
FIG. 8 is a flow chart showing the initial route selection operation of the first embodiment of this invention.

Next, the flow chart of FIG. 8 is used to explain initial route selection operation, executed prior to the start of communication of transmission signals by the optical transmission device 3 and optical receiving device 4, to determine which routes to select.

If the optical receiving device 4 which communicates with the optical transmission device 3 is fixed, and there are no changes between each communication, then upon introduction into the system of the optical transmission device 3 and optical receiving device 4, the processing of FIG. 8 is executed.

Suppose that a transmission signal is applied from the transmission terminal 2, so that the need to start new communication arises. In this case, the signal distributor 12 in the optical transmission device 3 divides the transmission signal into unit data amounts which can be handled by each optical channel card $13\text{-}1, \ldots, 13\text{-}n$ in a single transmission operation (limited data amounts at transmission rates corresponding to the existing connected WDM transmission network 1), and accumulates the result internally, and at the same time notifies the network management device 6 of the need to start new communication (step S1).

At this time, the network management device 6 searches for empty routes for each wavelength component $\lambda 1, \ldots, \lambda n$ connecting the optical transmission device 3 and optical receiving device 4 which are to communicate, and notifies the optical transmission device 3 of this empty route information (step S2).

The control signal processing unit 17 of the optical transmission device 3 receiving this notification applies the empty route information for each of the wavelength components $\lambda 1, \ldots, \lambda n$ to the corresponding optical channel cards $13\text{-}1, \ldots, 13\text{-}n$. Each optical channel card $13\text{-}1, \ldots, 13\text{-}n$ labels the empty routes (one route, or a plurality of routes) such that evaluation signals (optical signals) having that wavelength component are transmitted over these routes, and then each of the optical channel cards $13\text{-}1, \ldots, 13\text{-}n$ transmits evaluation signals to the WDM transmission network (step S3).

In the optical receiving device 4 upon receiving evaluation signals from the WDM transmission network 1 via empty routes, each of the optical receiving cards $32\text{-}1, \ldots, 32\text{-}n$ determines the optimal route from among the single empty route or plurality of empty routes for that wavelength component, based on the evaluation signals for its own wavelength component; the network management device 6 is then notified of these optimal routes and transmission quality information (the evaluation information described above in this first embodiment), via the receiving-side control signal processing unit 35 (step S4). The network management device 6 can also be made to determine the optimal route from among one empty route or a plurality of empty routes for the same wavelength component.

The network management device 6 compares transmission quality information for the optimal routes for each wavelength component; based on the comparison results, determines (that is, specifies) the wavelength components (optimal routes) in the required number for use in transmission; and notifies the optical channel cards for the plurality of wavelength components thus determined of the optimal routes, while at the same time sending notification to instruct switching from the evaluation signal transmission state to the transmission state for transmission signals distributed on optimal routes (steps S5, S6). Instead of instructing direct switching to the transmission state for distributed transmission signals, instructions can instead be issued to switch to a state in which distributed transmission signals can be sent, with transmission of distributed transmission signals performed after the distribution method has been determined. At the time of selection and determination of optimal routes, the band capacity at the time the amount of signal distribution is added to the candidate empty routes is considered.

For example, if q wavelength components are set to the same empty route, then if the band capacity for this empty route is exceeded, it is made the optimal route for (q−1) or fewer wavelength components.

Optical channel cards which have completed switching from the evaluation signal transmission state to the state for transmission of distributed transmission signals to optimal routes notify the network management device 6 of this fact (step S7), and the network management device 6 waits for notification of the completion of switching from all optical channel cards (step S8).

Figure 9:
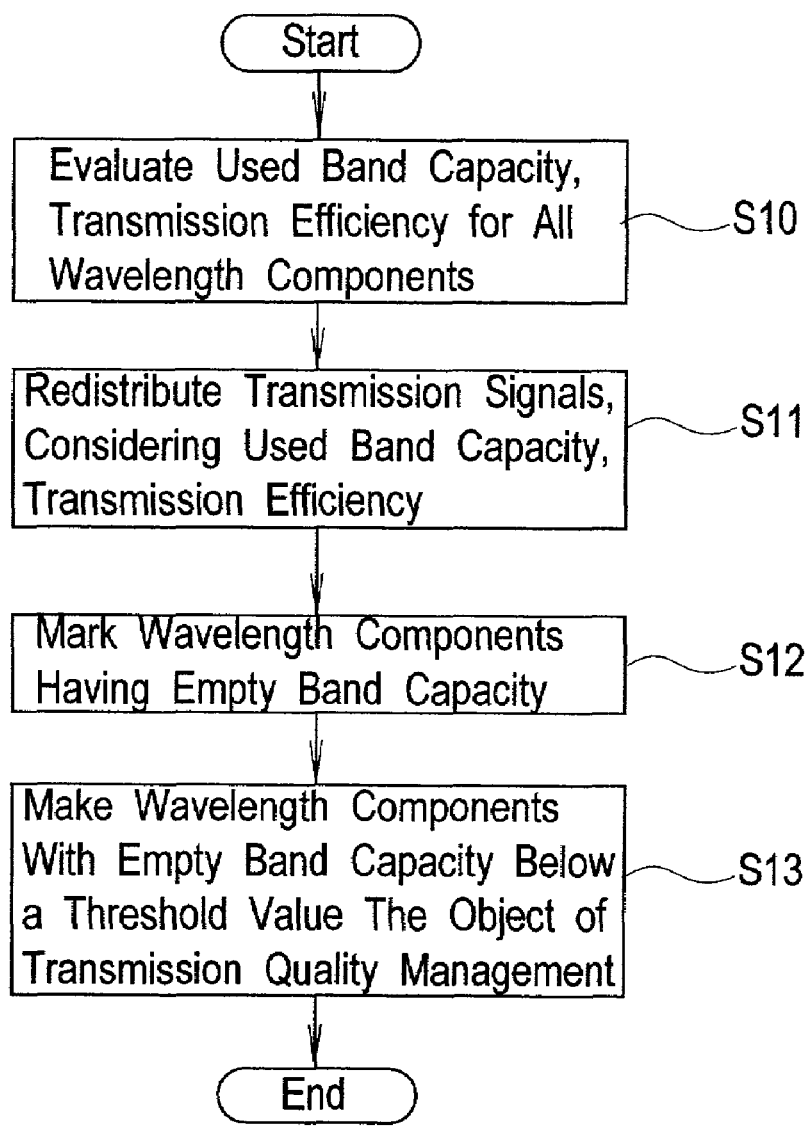
FIG. 9 is a flow chart showing the signal distribution operation of the first embodiment of this invention.

Having received notification of completion of switching from all optical channel cards, the network management device 6 or similar begins the signal distribution processing shown It in FIG. 9.

When the initial route selection operation described above is completed, transmission signals are, for example, distributed equally among a plurality of wavelength components (optical channel cards) used in transmission.

(A-2-3) Signal Distribution Operation

Next, the signal distribution operation (signal distribution adjustment operation) is explained, referring to the flow chart of FIG. 9. Signal distribution operation is executed not only during the start of communication described above, on completion of initial route selection operations in which wavelength components to be used and their optimal routes have been determined, but also upon completion of review of routes at the time of occurrence of NE defeets, described below. In addition, this signal distribution operation is also executed periodically.

The network management device 6 evaluates the used band capacity (in other words, the empty band capacity) and transmission efficiency for all wavelength components (routes) transmitting distributed transmission signals (step S10).

Here, information for all NEs (network elements) existing on a route is managed by the network management device 6, so that by evaluating the current state of traffic for each route and comparing the evaluations obtained with evaluations of band capacity allocated to that route, knowledge of empty band capacity can be obtained.

The network management device 6 constantly evaluates empty band capacity for all wavelength components during transmission, and in addition sends information to the signal distributor 12 so as to enable optimization of used band capacity and transmission efficiency, to cause revision of the distribution of signals to all wavelength components at which transmission is in progress (step S11). For example, in the case of routes (transmission paths) the transmission bands of which have equivalent capacities, signals are distributed to each wavelength component such that the same information quantities are sent via each route, taking the information transmission efficiency of the network into account.

Thereafter, the network management device 6 marks wavelength components for which there is sufficient empty band capacity (at or above a threshold value) after review of distribution, and maintains the empty band state for these wavelength components (step S12). Such wavelength components are utilized as wavelength components for switching in the event of occurrence of a defect in an optical channel card, described below.

After distribution review, the network management device 6 also sets, as objects for transmission quality management, those wavelength components for which there is no empty band capacity, or for which the empty band capacity is below the threshold value (step S13).

Figure 10:
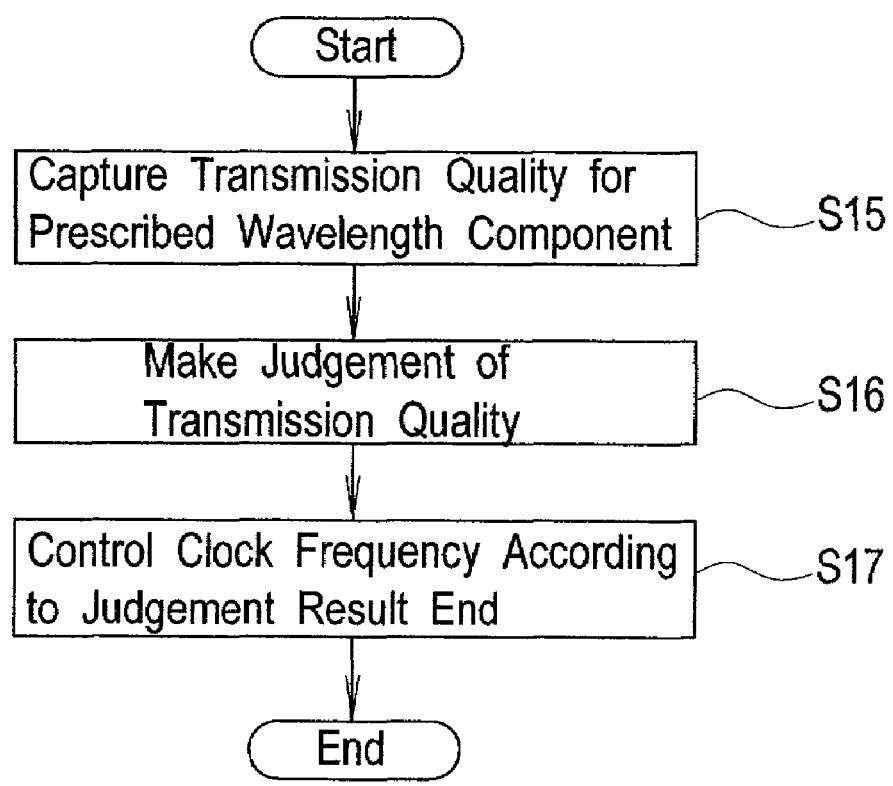
FIG. 10 is a flow chart showing the transmission quality evaluation and control operation of the first embodiment of this invention.

Wavelength components which have been set as objects for transmission quality management are subjected to transmission quality evaluation at prescribed intervals and also to IS transmission speed control, as shown in FIG. 10, explained below.

(A-2-4) Operation for Evaluation and Control of Transmission Quality

Next, operation is explained, referring to the flow chart of FIG. 10, in which transmission quality is evaluated for wavelength components which have been set as the objects for management of transmission quality, and control is performed accordingly.

When setting a prescribed wavelength component as an object for transmission quality management, step S13 in the above-described FIG. 9 is used.

At each prescribed period, or when processing by step S23 is completed in operations on the occurrence of a defect in an optical channel card, described below, the network management device 6 begins the processing of FIG. 10. Then, for wavelength components which are the objects of transmission quality management, the management device 6 reads transmission quality information from the optical receiving cards of the optical receiving device 4 (step S15), and makes a pass/fail judgment on the state of the transmission quality (step S16).

For example, a CRC or other error detection code could be inserted into the distributed transmission signal for transmission (with processing performed by the signal distributor 12 or another component), and based on this, the bit error rate (BER) could be obtained as transmission quality information. Or, an evaluation signal could be added before or after the distributed transmission signal and transmission performed, and the BER could be obtained as transmission quality information based on the result of receiving the evaluation signal. By means of an aspect such as the modification of the first embodiment, described below, transmission quality information can be obtained directly by optical means.

If, for a wavelength component which is an object of transmission quality management, there is leeway in the transmission quality, the network management device 6 instructs the optical channel card of the optical transmission device 3 for the wavelength component to raise the clock frequency. On the other hand, if the transmission quality of the wavelength component is degenerated, the management device 6 instructs the optical channel card of the optical transmission device 3 for the wavelength component to lower the clock frequency. If the transmission quality is at the standard level, the management device 6 instructs the optical channel card of the optical transmission device 3 for the wavelength component to maintain the clock frequency (step S17). In other words, by executing reviews of the transmission speed (clock frequency) in accordance with the transmission quality, the optical channel card is controlled so as to achieve its optimal transmission speed.

Figure 11:
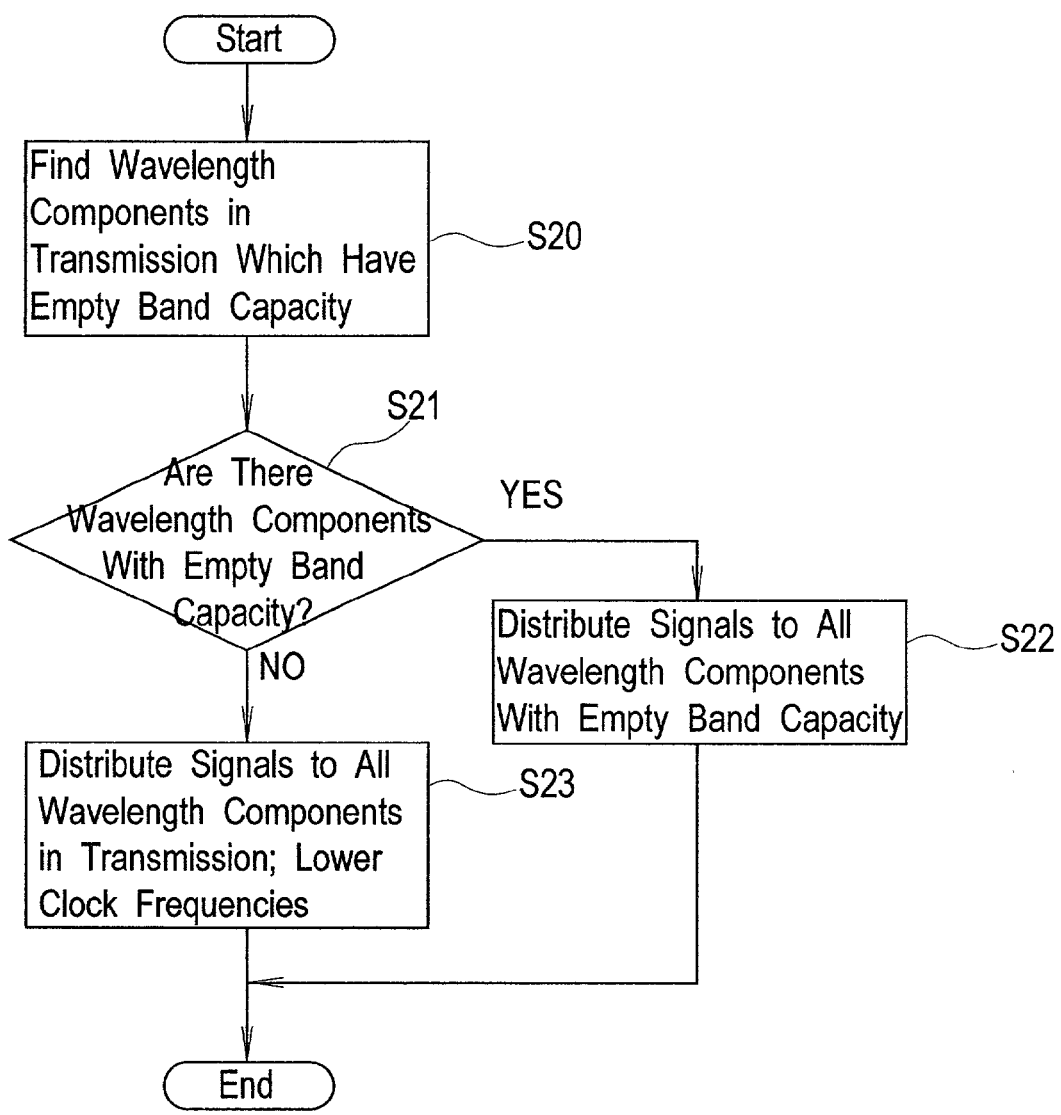
FIG. 11 is a flow chart showing the rerouting operation, upon occurrence of an optical channel card defect, of the first embodiment of this invention.

(A-2-5) Operation on the Occurrence of Defects in Optical Channel Cards and Optical Receiving Cards Next, the operation (rerouting operation) to review the distribution of distributed transmission signals when a defect occurs in any of the optical channel cards of the optical transmission device 3, used in transmission of distributed transmission signals, is explained, referring to the flow chart of FIG. 11. Specifically, constituent members which are the object of malfunction detection, such as for example optical channel cards 13, are called as internal constituent members.

Even when a defect occurs in any of the optical receiving cards of the optical receiving device 4, the operation shown in this FIG. 11 is executed.

When the network management device 6 either is notified by the optical transmission device 3 of the occurrence of a defect in any of the optical channel cards, or recognizes the occurrence of a defect in any of the optical channel cards of the optical transmission device 3, after first finding empty band capacity in the wavelength components provided for transmission of distributed transmission signals based on information stored by the management device itself (see step S12 in FIG. 9), a judgment is performed as to whether there are wavelength components with empty band capacity (steps S20, S21).

Then, if there is even one wavelength component having empty band capacity, the network management device 6 instructs the signal distributor 12 to distribute the transmission signal capacity (data capacity) which had been distributed to the optical channel card in which the defect occurred to all the wavelength components having empty band capacity, and by this means the method of distribution of transmission signals in the signal distributor 12 is modified (step S22).

After the conclusion of the processing shown in FIG. 11, when the above-described processing of FIG. 9 is begun, the presence or absence of empty band capacity is confirmed for wavelength components for which band capacity (data capacity) have been added, and as a result, wavelength components are set as objects for transmission quality management as necessary. When a wavelength component is set as an object for transmission quality management, the above-described processing shown in FIG. 10 is executed.

On the other hand, when there exist no wavelength components having empty band capacity, the network management device 6 instructs the signal distributor 12 to distribute transmission signal capacity (data capacity) which had been distributed to an optical channel card (wavelength component) in which a defect has occurred to all wavelength components currently used in transmission other than the wavelength component of the optical channel card in which the defect has occurred. By means of this instruction, the method of distribution of transmission signals in the signal distributor 12 is changed, and at the same time clock frequencies are lowered to accompany the addition of data quantities (step S23). After this processing, instead of returning to the main routine, the above-described processing of FIG. 10 (processing to control transmission speeds according to transmission quality) is immediately executed. As is easily understood from the above explanation, when a defect occurs in an optical channel card 13 or optical receiving card 32, the network management device 6 performs a distribution review operation (rerouting operation), and operates to avoid internal defects; hence this network management device 6 functions as an optical transmission unit internal defect avoidance means.

The reason for lowering clock frequencies as described above is to prevent in advance the possibility that adequate transmission quality cannot be maintained owing to the addition of data quantities in a state in which there is no empty band capacity.

(A-2-6) Operation Upon Occurrence of Defects in Network Elements (NEs)

Figure 12:
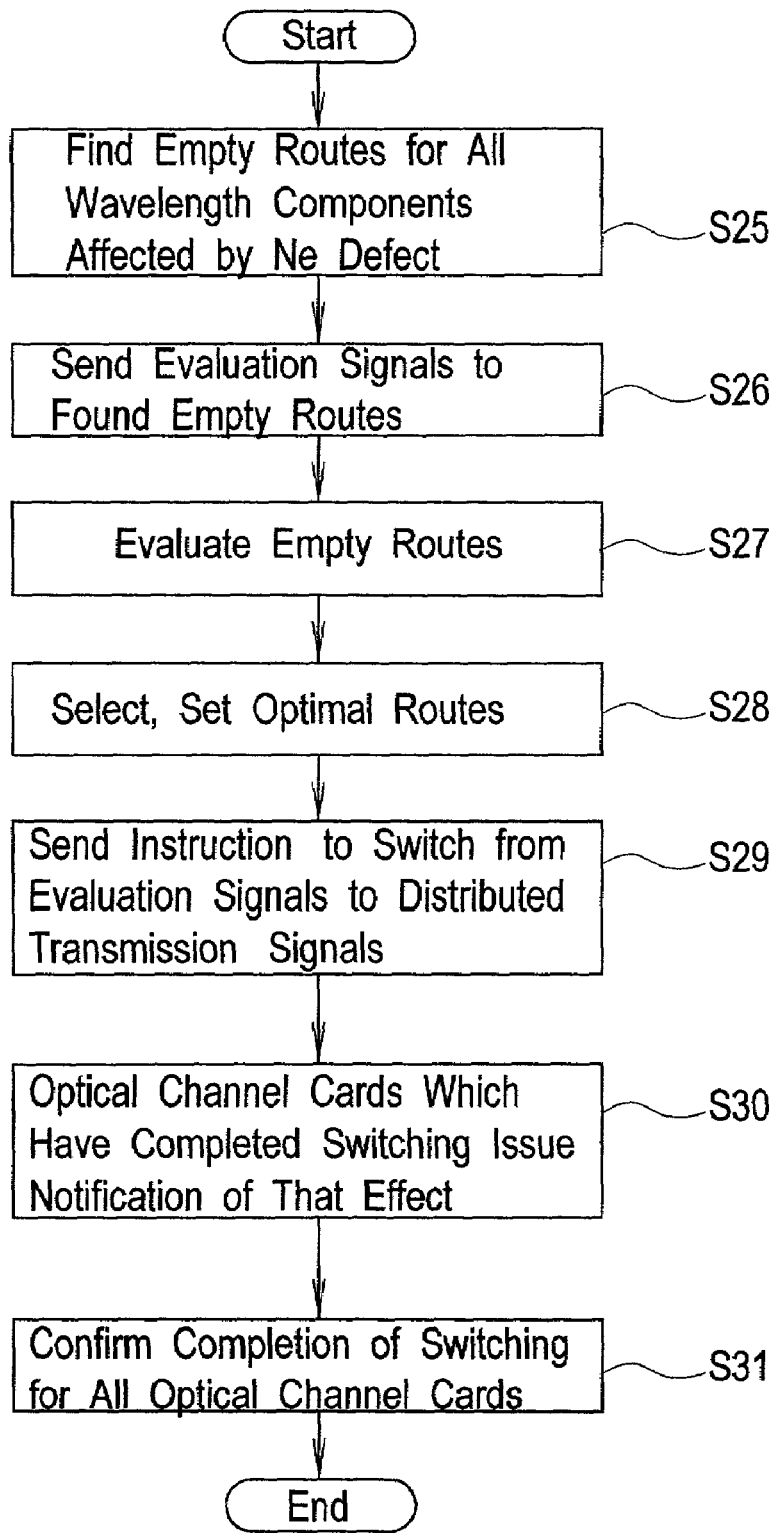
FIG. 12 is a flow chart showing the rerouting operation, upon occurrence of a network element defect, of the first embodiment of this invention.

Next, operation to review the distribution of distributed transmission signals (rerouting operation) on the occurrence of defects in network elements (NEs) is explained, referring to the flow chart of FIG. 12.

When notified by the WDM transmission network 1 that a defect has occurred in one of the NEs, or upon recognizing that a defect has occurred in one of the NEs, the network management device 6 treats the NE in which the defect has occurred as an element provided on routes, and searches for empty routes for all wavelength components, notifying the optical transmission device 3 of the information on these empty routes (step S25).

On receiving this notification, the transmission-side control signal processing unit 17 of the optical transmission device 3 provides the corresponding optical channel cards with the information on empty routes for each of the respective wavelength components, and after labeling the empty routes (one route, or a plurality of routes) such that evaluation signals (optical signals) having the wavelength components are transmitted on the routes, each optical channel card transmits an evaluation signal to the WDM transmission network 1 (step S26).

In the optical receiving device 4, after being provided with evaluation signals from the WDM transmission network 1 via empty routes, each optical receiving card determines the optimal route from among one or a plurality of empty routes for that wavelength component, based on the evaluation signal of the wavelength component for that card, and notifies the network management device 6 of the optimal route and transmission quality information via the receiving-side control signal processing unit 35 (step S27).

The network management device 6 compares transmission quality information for the optimal routes for each wavelength component, and for each wavelength component determines the it optimal route to replace the route which has until now been used, as well as notifying the optical channel card for the wavelength component responsible for the newly determined optimal route; at the same time, the management device issues an instruction to switch from the transmission state for evaluation signals to the transmission state for distributed transmission signals on optimal routes (steps S28, S29).

Optical channel cards which have completed switching from the transmission state for evaluation signals to the state enabling transmission of distributed transmission signals to new optimal routes notify the network management device 6 of this fact (step S30), and the network management device 6 waits for notification of the completion of switching from all optical channel cards instructed to perform switching (step S31).

Having received notification of completion of switching from all optical channel cards, the network management device 6 or similar begins the signal distribution routine shown in FIG. 9, described above.

When beginning the processing of FIG. 9 described above, the presence or absence of empty band capacity is confirmed for wavelength components (including other wavelength components) switched to new optimal routes from optimal routes passing through NEs in which defects have occurred. Based on the results of this confirmation, switched wavelength components are, as necessary, set as wavelength components as an object for transmission quality management. If a wavelength component is set as an object for transmission quality management, the processing shown in FIG. 10 described above is executed, and the transmission speed is controlled appropriately.

(A-3) Advantageous Results of the First Embodiment

According to the wavelength division multiplex transmission system of the first embodiment of the present invention, optimal routes are selected for each wavelength component, in consideration of transmission characteristics and other information, so that satisfactory transmission characteristics can be achieved compared with conventional configurations.

Further, according to the first embodiment, the band capacity used and transmission efficiency for each wavelength component are judged, and data quantities are distributed dynamically among wavelength components, so that transmission efficiency of routes in use is appropriately divided, and as a result the concentration of data in a given route can be prevented.

According to the first embodiment, transmission quality is monitored for wavelength components with little or no empty band capacity, and clock frequencies are changed according to the transmission quality, so that a minimum transmission quality can be maintained for such wavelength components as well.

According to the first embodiment, even when a defect occurs in a network element, the optimal routes are re-selected, taking optical transmission characteristics into account, for each wavelength component of routes on which the element is provided as a route element, and redistribution of the data quantities for these wavelength components is performed. Hence congestion can be prevented, and compared with conventional configurations, the probability of circuit breaks arising in the event of occurrence of defects in network elements can be lowered.

According to the first embodiment, upon occurrence of a defect in an optical channel card or optical receiving card, data quantities for wavelength components related to the defect are simply redistributed to other wavelength components according to empty band capacity, so that measures can be taken promptly. In such redistribution, the clock frequency is changed appropriately for wavelength components the band capacity of which has become constricted, so that at least a certain degree of transmission quality can be maintained.

(A-4) Modification of the First Embodiment

In the above explanation of the first embodiment, various modified embodiments were also mentioned; in addition, a modified embodiment such as the example indicated below can be cited.

The method used to obtain information for evaluating routes or for determining transmission quality is not limited to that explained in the above first embodiment.

Figure 13:
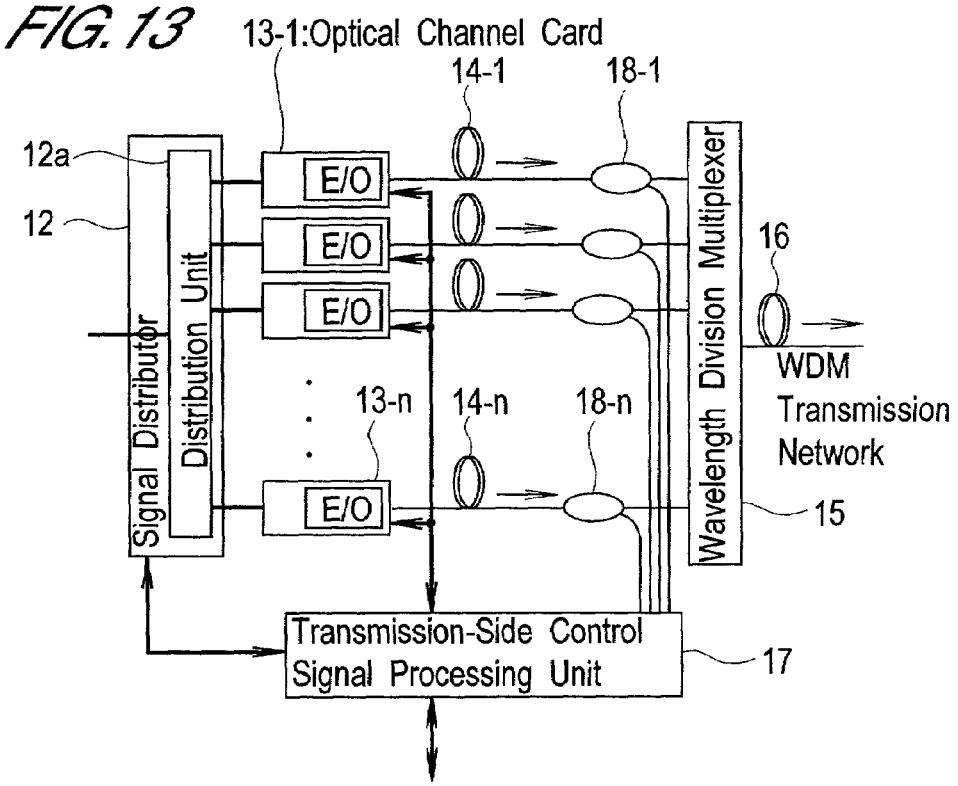
FIG. 13 is a block diagram showing the configuration of principal components of the optical transmission device in a modification of the first embodiment of this invention.

For example, in order to determine transmission quality or evaluate routes, if parameters such as optical power information in each of the wavelength components are necessary at the optical signal stage in the optical transmission device 3, the optical transmission device 3 may be configured such that optical couplers 18-1, . . . , 18-$n$ are provided to branch the emitted light output from each of the optical channel cards 13-1, . . . , 13-$n$, as shown in FIG. 13, and branched monitor light from these optical couplers is input to the transmission-side control signal processing unit 17. In this case, there must be a photoelectric converter within the transmission-side control signal processing unit 17.

Figure 14:
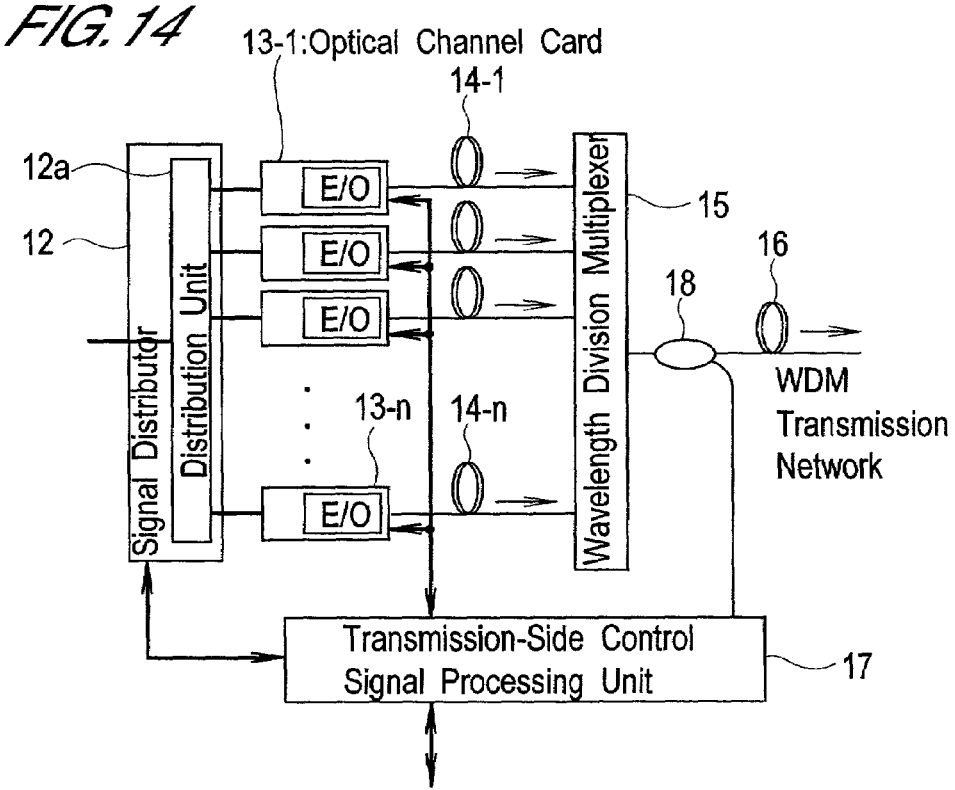
FIG. 14 is a block diagram showing the configuration of principal components of the optical transmission device in a modification of the first embodiment of this invention.

Or, for example, in order to determine transmission quality and evaluate routes, if output light power information and other parameters from the optical transmission device 3 at the WDM signal stage is necessary, the optical transmission device 3, as shown in FIG. 14, may be configured such that optical couplers 18 are provided which branch output light on the back-stage side of the wavelength division multiplexer 15, so that branched monitor light from the optical couplers is input to the transmission-side control signal processing unit 17. In this case also, there must be a photoelectric converter within the transmission-side control signal processing unit 17.

Figure 15:
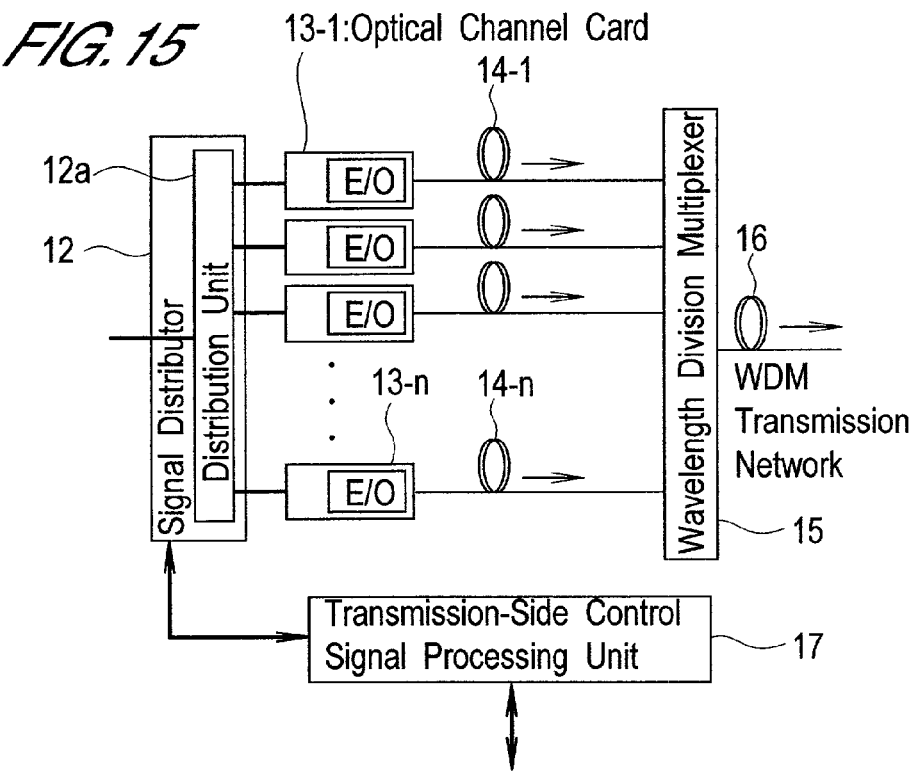
FIG. 15 is a block diagram showing the configuration of principal components of the optical transmission device in a modification of the first embodiment of this invention.

Or, for example, in order to determine transmission quality and evaluate routes, the optical transmission device 3 may be configured such that an instruction signal or similar to cause the optical channel cards 13-1 to 13-$n$ to output evaluation signals (optical signals) is applied to the optical channel cards 13-1 to 13-$n$ from the transmission-side control signal processing unit 17 via the signal distributor 12, as shown in FIG. 15.

Of course the modified embodiments of the optical transmission device 3 shown in FIG. 13 through FIG. 15 may be combined freely.

Figure 16:
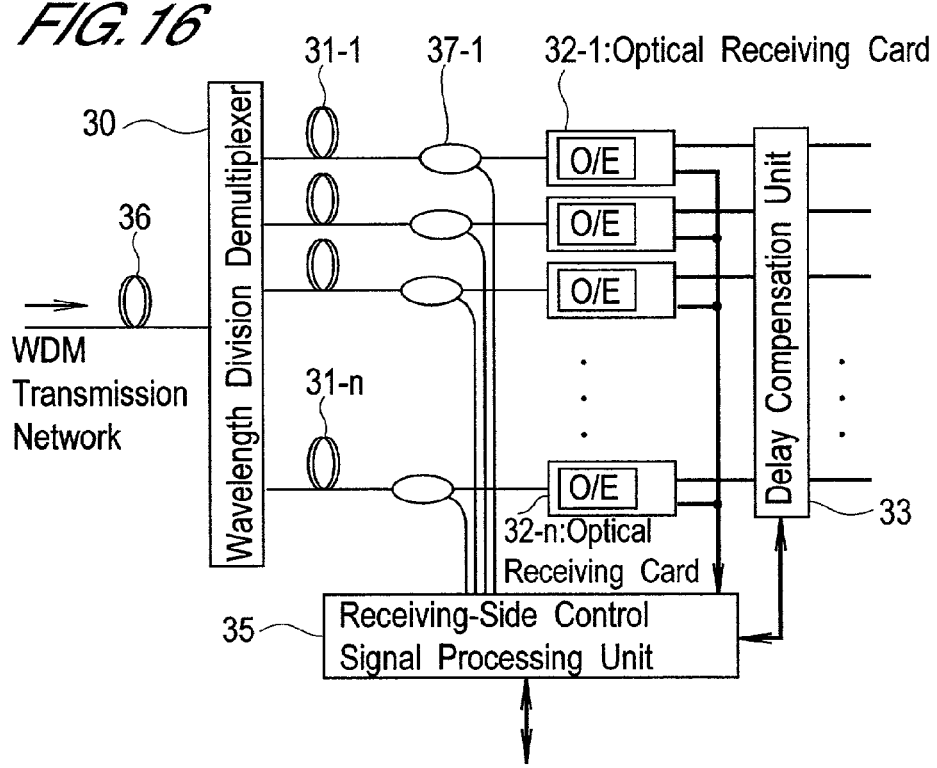
FIG. 16 is a block diagram showing the configuration of principal components of the optical receiving device in a modification of the first embodiment of this invention.

For example, in order to determine transmission quality and evaluate routes, if parameters such as optical power information in each of the wavelength components of the received light in the optical receiving device 4 are necessary at the optical signal stage, the optical receiving device 4 may be configured such that optical couplers 37-1, . . . , 37-$n$ are provided to branch light incident on each of the optical receiving cards 32-1, . . . , 32-$n$ as shown in FIG. 16, and branched monitor light from these optical couplers is input to the receiving-side control signal processing unit 35. In this case, there must be a photoelectric converter within the receiving-side control signal processing unit 35.

Figure 17:
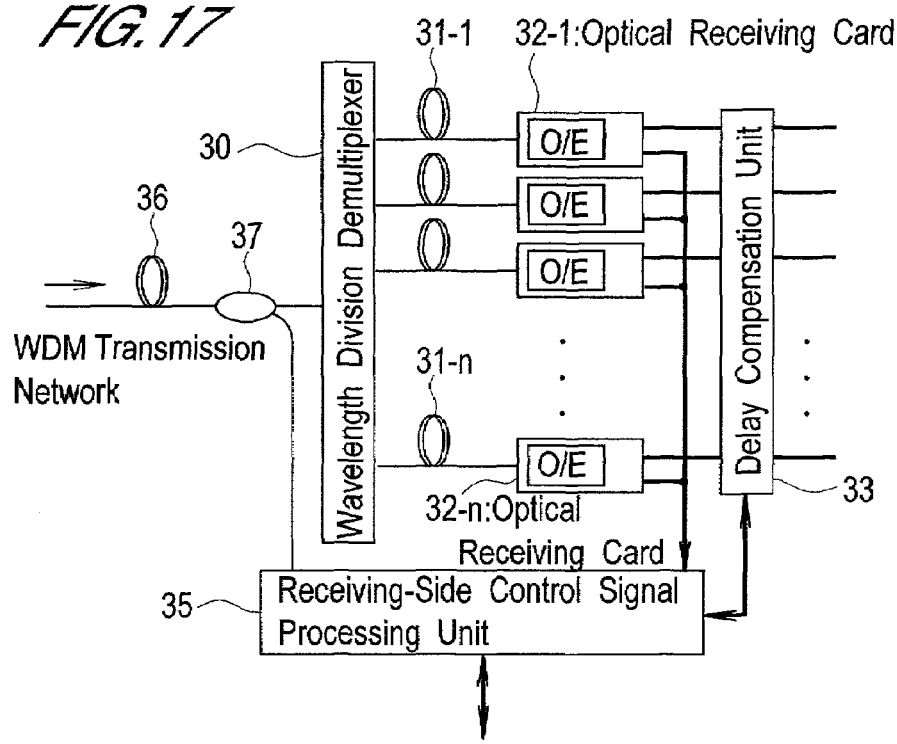
FIG. 17 is a block diagram showing the configuration of principal components of the optical receiving device in a modification of the first embodiment of this invention.

Or, for example, in order to determine transmission quality and evaluate routes, if parameters at the WDM signal stage such as optical power information for the light input to the optical receiving device 4 are necessary, the optical receiving device 4 may be configured such that on the front stage side of the wavelength division demultiplexer 30 is provided an optical coupler 37 to branch the output light, with branched monitor light from this optical coupler input to the receiving-side control signal processing unit 35, as shown in FIG. 17. In this case also, there must be a photoelectric converter within the receiving-side control signal processing unit 35.

Figure 18:
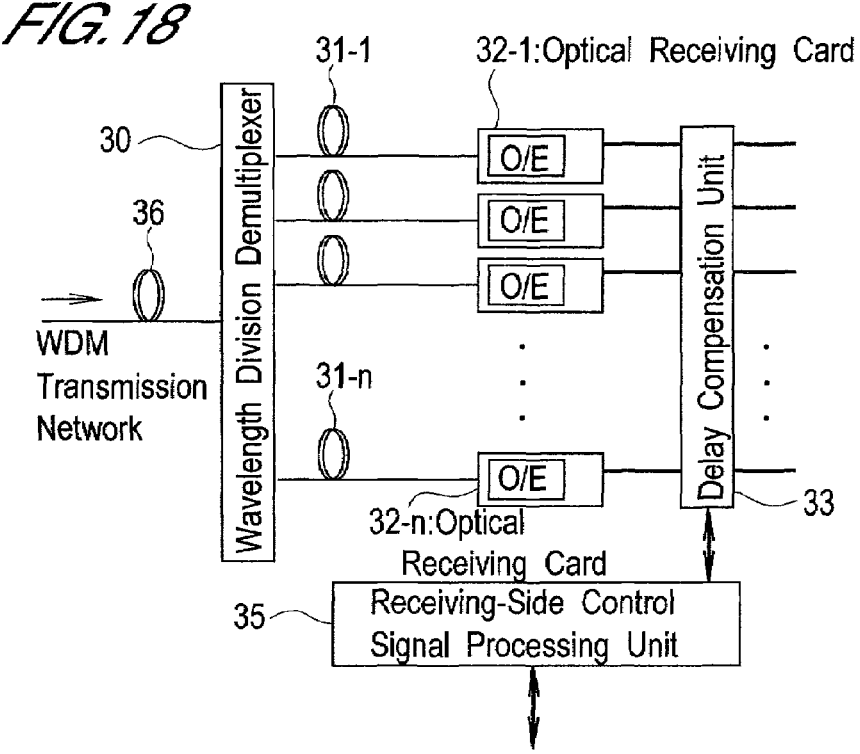
FIG. 18 is a block diagram showing the configuration of principal components of the optical receiving device in a modification of the first embodiment of this invention.

Or, for example, in order to determine transmission quality and evaluate routes, the method by which the receiving-side control signal processing unit 35 captures evaluation and other information from the optical receiving cards 32-1 to 32-$n$ may be a method which captures the information via the delay compensation unit 33, as shown in FIG. 18.

Of course the modified embodiments of the optical receiving device 4 shown in FIG. 16 through FIG. 18 may be combined freely.

Because the transmission-side control signal processing unit 17 and receiving-side control signal processing unit 35 function by means of signals, in some cases they may be omitted.

Evaluation signals are transmitted at times other than when setting initial routes also. Such methods include, in addition to the method of dividing the transmission time for distributed transmission signals and the transmission time for evaluation signals, the method of intermixing distributed transmission signals and evaluation signals; or, after modulation of distributed transmission signals and evaluation signals while varying the method of electrical modulation, they may be superposed and converted into optical signals, and simultaneously transmitted.

(B) Second Embodiment

Next, a second embodiment of the wavelength division multiplex transmission system of this invention is explained in detail, referring to the drawings.

(B-1) Configuration of the Second Embodiment

Figure 19:
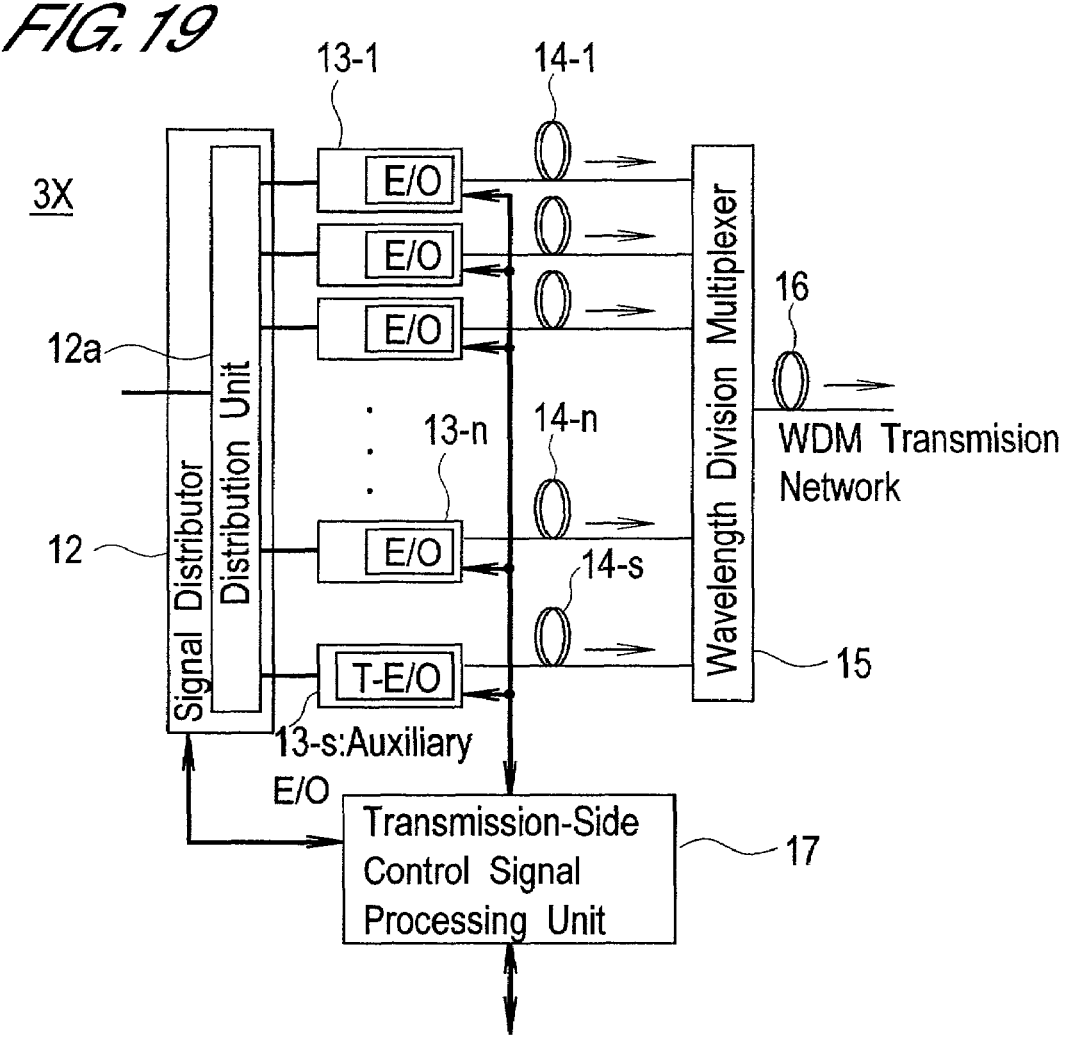
FIG. 19 is a block diagram showing the configuration of principal components of the optical transmission device of a second embodiment of the wavelength division multiplex transmission system of this invention.

FIG. 19 is a block diagram showing the configuration of principal components of the optical transmission device 3X of the second embodiment; parts which are the same or corresponding in FIG. 4 for the first embodiment are assigned corresponding symbols.

In addition to the configuration of the first embodiment, the optical transmission device 3X of this second embodiment is provided with an auxiliary optical channel card 13-S. The auxiliary optical channel card 13-S functions whenever a defect occurs in one of the optical channel cards 13-1 to 13-$n$ or in one of the optical receiving cards 32-1 to 32-$n$ of the opposing optical receiving device 4X (see FIG. 20). A wavelength component $\lambda$s, different from the wavelength components $\lambda$1 to $\lambda$n of the optical channel cards 13-1 to 13-$n$, is allocated to the auxiliary optical channel card 13-S; except for this fact, the internal configuration is the same as for optical channel cards 13-1 to 13-$n$.

Figure 20:
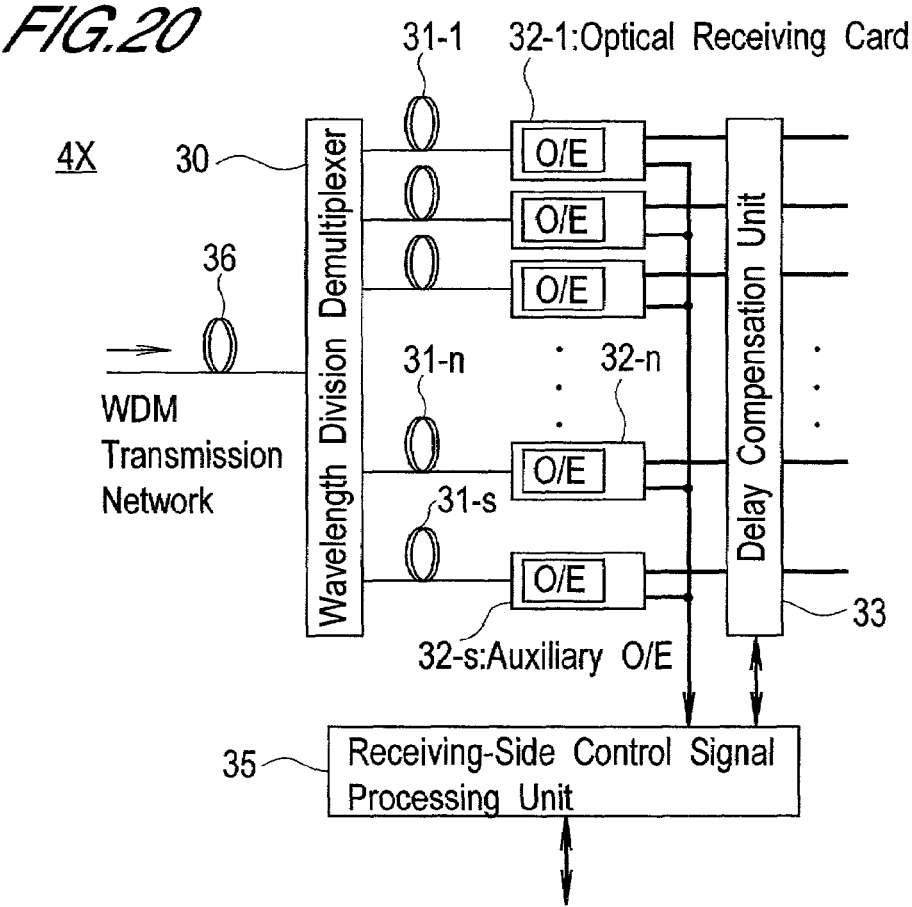
FIG. 20 is a block diagram showing the configuration of principal components of the optical receiving device of the second embodiment of this invention.

FIG. 20 is a block diagram showing the configuration of principal components of the optical receiving device 4X of the second embodiment; parts which are the same or corresponding in FIG. 6 for the first embodiment are assigned corresponding symbols.

In addition to the configuration of the first embodiment, the optical receiving device 4X of this second embodiment is provided with an auxiliary optical receiving card 32-S. The auxiliary optical receiving card 32-S functions when the auxiliary optical channel card 13-S of the optical transmission device 3X is functioning. Of course the auxiliary optical receiving card 32-S performs receiving operations for the optical signal of the wavelength component $\lambda$s; except for this fact, it is similar to the optical receiving cards 32-1 to 32-$n$.

In the case of this second embodiment, the WDM transmission network 1 is configured so as to be able to accommodate optical signals with the wavelength component $\lambda$s.

(B-2) Operation of the Second Embodiment

Next, each type of operation of the wavelength division multiplex system of the second embodiment of the present invention is explained. Operations other than operations when a defect occurs in any of the optical channel cards is similar to the operation of the first embodiment, and so an explanation is omitted.

Figure 21:
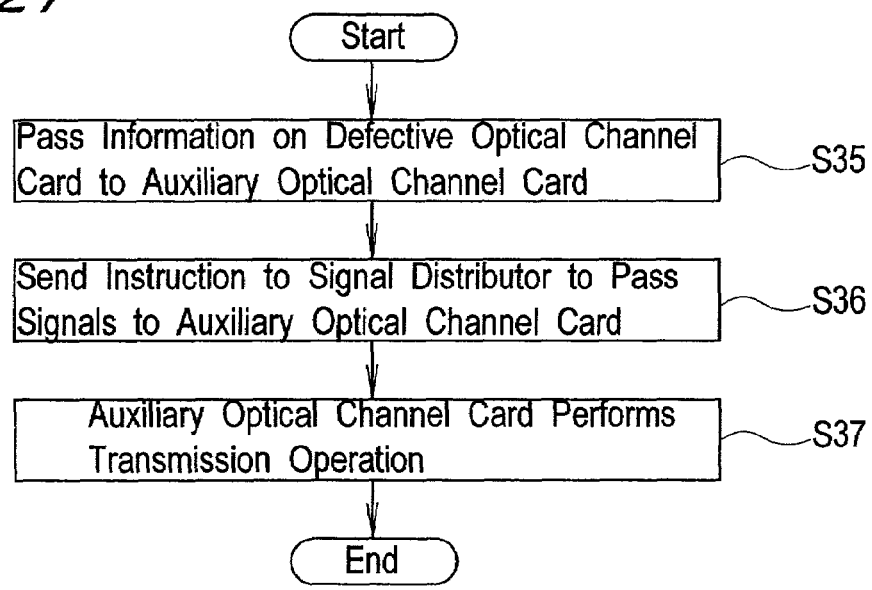
FIG. 21 is a flow chart showing the operation, upon occurrence of an optical channel card defect, of the second embodiment of the invention.

FIG. 21 is a flow chart showing the operations in the event of occurrence of a defect in any of the optical channel cards. Even when a defect occurs in any of the optical receiving cards, the operations of FIG. 21 are executed.

When notified by the optical transmission device 3 that a defect has occurred in one of the optical channel cards, or upon recognizing that a defect has occurred in one of the optical channel cards of the optical transmission device 3, the network management device 6 sends the various parameters for the optical channel card in which the defect has occurred (for example, route, power, transmission speed) to the auxiliary optical channel card 13-S, and by this means the optical channel card 13-S is set in a state enabling transmission according to the various parameters (step S35).

Next, upon recognizing that settings have been completed, the network management device 6 instructs the signal distributor 12 to send to the auxiliary optical channel card 13-S distributed transmission signals which had been distributed to the optical channel card in which the defect occurred (step S36). By this means, the auxiliary optical channel card 13-S performs transmission of distributed transmission signals in place of the optical channel card in which the defect occurred (step S37).

If a defect occurs in one of the optical channel cards or optical receiving cards in a state in which the auxiliary optical channel card 13-S and auxiliary optical receiving card 32-S are already being used, operation similar to the operation in the first embodiment, shown in FIG. 11 above, is executed.

(B-3) Advantageous Results of the Second Embodiment

According to of the wavelength division multiplex transmission system of the second embodiment of this invention also, advantages similar to those of the first embodiment can be obtained.

Further, according to the second embodiment, even if a defect occurs in one of the optical channel cards or optical receiving cards normally used in transmission, by providing an auxiliary optical channel card 13-S and auxiliary optical receiving card 32-S on the transmission side and receiving side respectively, transmission (defect recovery) can be performed without reducing the number of channels (number of wavelength components) of transmission signals. Hence a system can be realized which is more robust with respect to congestion than the first embodiment of the invention.

(B-4) Modification of the Second Embodiment

The system which was cited as a modification of the first embodiment also represents a modification of the second embodiment.

In the above explanation, the case in which there is one auxiliary wavelength component (optical channel card and optical receiving card) was described; but a plurality can be prepared as well.

Further, in the above explanation the route of the auxiliary wavelength component was the same as the route of the optical channel card or optical receiving card in which the defect has occurred; but the system may be configured such that a search for the optimal route is performed for the auxiliary wavelength component as well. This search may be performed after a defect has occurred in one of the optical channel cards or optical receiving cards. Or, the optimal route for the auxiliary wavelength component may be determined in advance at the time of determination of optimal routes for all wavelength components.

In the above explanation, the auxiliary wavelength component was fixed; however, the system may be configured such that the auxiliary wavelength component can be selected so that, when determining optimal routes for all wavelength components, the auxiliary wavelength component is, for example, the wavelength component for which the evaluation result was lowest.

(C) Third Embodiment

Next, a third embodiment of the wavelength division multiplex transmission system of this invention is explained in detail, referring to the drawings.

(C-1) Configuration of the Third Embodiment

Figure 22:
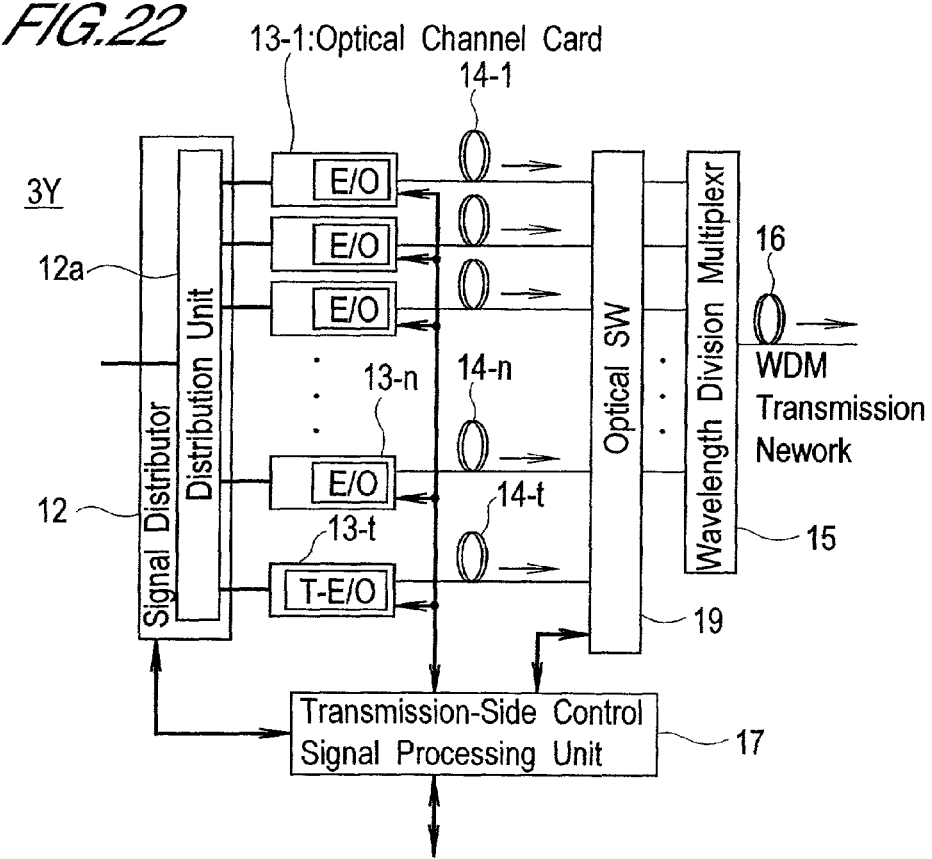
FIG. 22 is a block diagram showing the configuration of principal components of the optical transmission device of a third embodiment of the invention.

FIG. 22 is a block diagram showing the configuration of principal components of the optical transmission device 3Y of the third embodiment; parts which are the same or corresponding in FIG. 4 for the first embodiment are assigned corresponding symbols.

In addition to the configuration of the first embodiment, the optical transmission device 3Y of this third embodiment is provided with an auxiliary optical channel card 13-$t$ and optical switch (optical SW) 19.

The auxiliary optical channel card 13-$t$ functions when a defect occurs in one of the optical channel cards 13-1 to 13-$n$. This auxiliary optical channel card 13-$t$ of the third embodiment can capture, under instructions from outside, wavelengths within the range of the wavelength components $\lambda$1 to $\lambda$n for all the optical channel cards 13-1 to 13-$n$. That is, the auxiliary optical channel card 13-$t$ is a variable-wavelength optical channel card.

Figure 23:
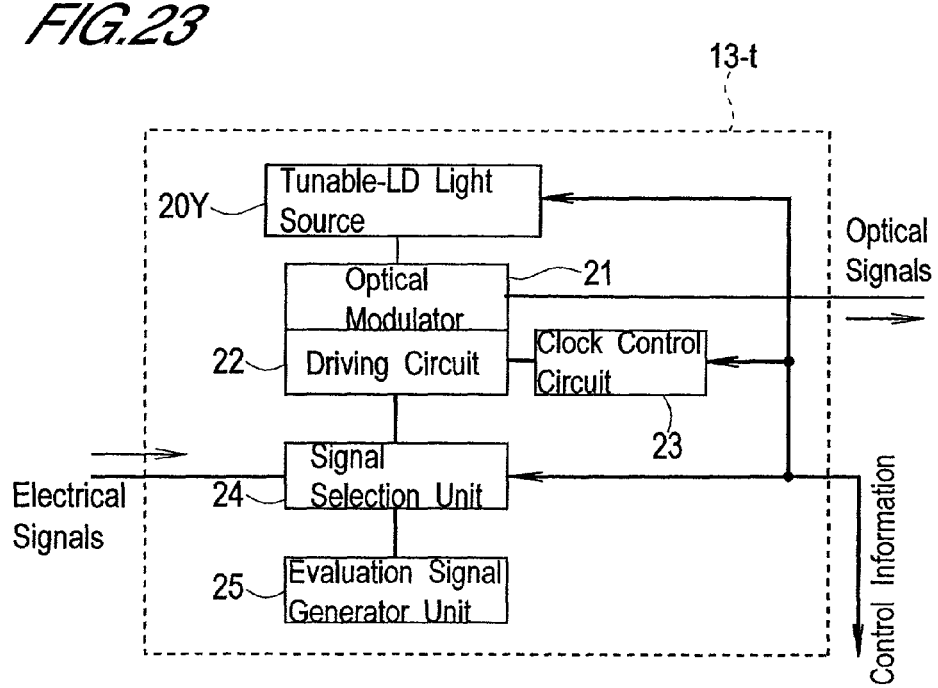
FIG. 23 is a block diagram showing an example of the detailed configuration of an auxiliary optical channel card (variable-wavelength optical channel card) of the third embodiment of this invention.

FIG. 23 is a block diagram showing an example of the detailed configuration of the auxiliary optical channel card 13-t (variable-wavelength optical channel card) of the third embodiment; parts which are the same or corresponding in FIG. 5 for the first embodiment are assigned corresponding symbols.

In the auxiliary optical channel card 13-t of FIG. 23, a variable-wavelength (tunable) LD light source 20Y can be employed as the light source. The auxiliary channel card 13-t is configured such that, by applying a wavelength instruction to this variable-wavelength LD light source 20Y from the transmission-side control signal processing unit 17, an optical signal having the desired wavelength can be sent.

The optical switch 19 (FIG. 22) selects n optical signals from among the optical signals from the optical channel cards 13-1 to 13-n and the auxiliary optical channel card 13-t, for a total of n+1 optical channel cards, and outputs these signals to the wavelength division multiplexer 15, according to exchange instructions from the transmission-side control signal processing unit 17.

For example, in a state in which no defects have occurred in the optical channel cards 13-1 to 13-n ordinarily used in transmission, the optical switch 19 selects the optical signals from the optical channel cards 13-1 to 13-n as they are, and applies them to the wavelength division multiplexer 15.

Or, for example, in a state in which a defect has occurred in the optical channel card 13-1, the optical switch 19 selects the optical signals from the optical channel cards 13-2 to 13-n and from the auxiliary optical channel card 13-t, and applies them to the wavelength division multiplexer 15.

In the case of this third embodiment, the configuration of the optical transmission device 3Y differs from that of the above-described first embodiment, but the configuration of the optical receiving device 4 is the same as that of the first embodiment.

(C-2) Operation of the Third Embodiment

Next, operation of the wavelength division multiplex transmission system of the third embodiment is explained. Operations other than operations when a defect occurs in any of the optical channel cards is similar to the operation of the first embodiment, and so an explanation is omitted.

Figure 24:
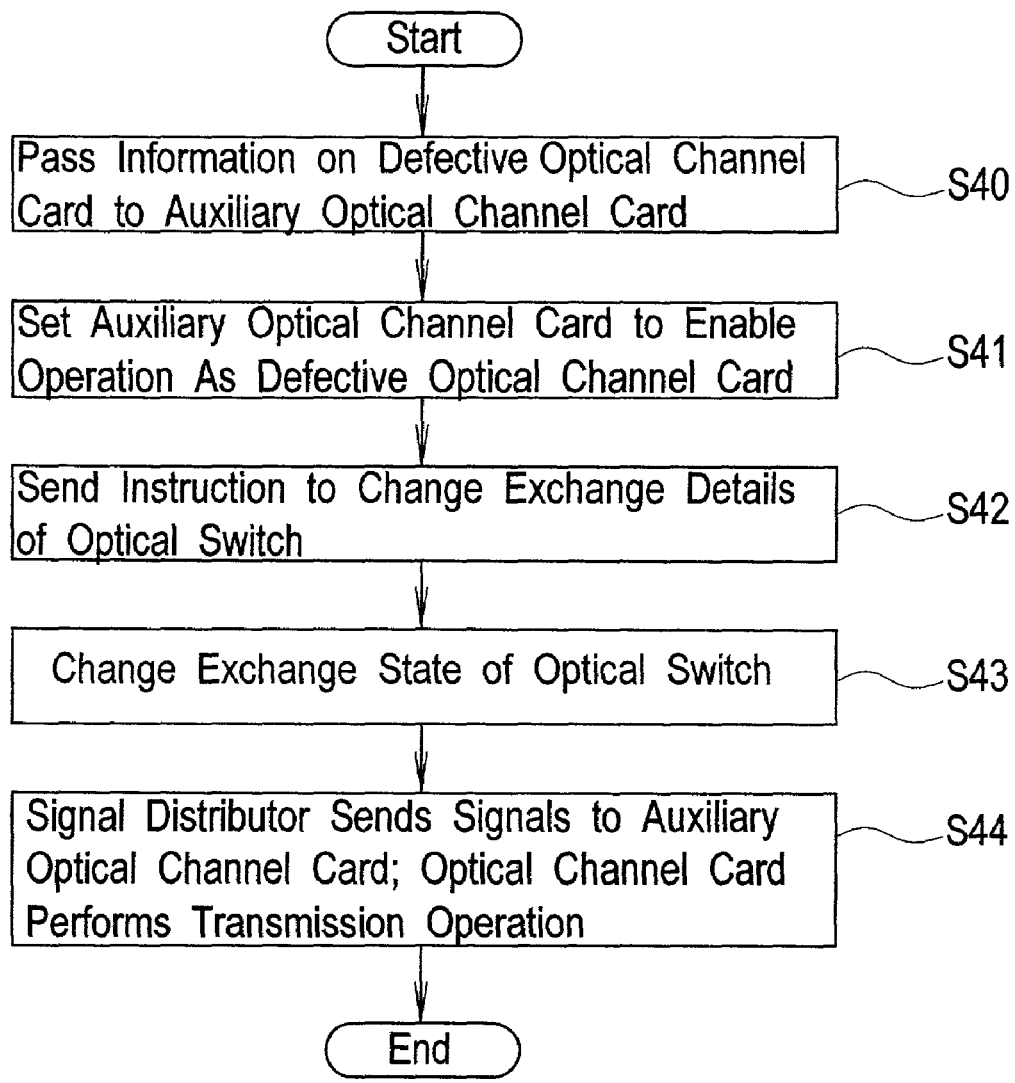
FIG. 24 is a flow chart showing the operation, upon occurrence of an optical channel card defect, of the third embodiment of this invention.

FIG. 24 is a flow chart showing operation when a defect occurs in one of the optical channel cards.

On being notified by the optical transmission device 3 that a defect has occurred in one of the optical channel cards (hereafter assumed to be card 13-1), or on recognizing that a defect has occurred in one of the optical channel cards (13-1) of the optical transmission device 3, the network management device 6 sends to an auxiliary variable-wavelength optical channel card 13-t the various parameters (for example, wavelength, route, power, transmission speed) of the optical channel card 13-1 in which the defect has occurred, and by this means the auxiliary variable-wavelength optical channel card 13-t is set to a state in which transmission can be performed according to the various parameters (steps S40, S41).

Through these settings, the auxiliary variable-wavelength optical channel card 13-t is put into a state in which optical signals with the wavelength component λ1 of the optical channel card 13-1 in which a defect has occurred can be sent. In other words, the auxiliary variable-wavelength optical channel card 13-t becomes a pseudo-optical channel card 13-1.

The network management device 6 instructs the optical switch 19 to perform exchanges such that optical signals from the auxiliary variable-wavelength optical channel card 13-tare input to the input point of the wavelength division multiplexer 15 at which optical signals from the optical channel card 13-1 in which the defect has occurred had been input; as a result, the optical switch 19 changes to an exchange state conforming to this instruction (steps S42 and S43)

After confirming that the variable-wavelength optical channel card 13-t and optical switch 19 have executed the state changes and other instructions, the network management device 6 instructs the signal distributor 12 to apply to the auxiliary variable-wavelength optical channel card 13-t the distributed transmission signals which had been distributed to the optical channel card 13-t in which the defect had occurred (step S44).

By this means, the variable-wavelength optical channel card 13-t behaves as if it were the optical channel card 13-1 in which the defect has occurred.

If a defect occurs in one of the optical channel cards while in a state in which the auxiliary variable-wavelength optical channel card 13-t is already in use, the operation of the above-described first embodiment is executed.

(C-3) Advantageous Results of the Third Embodiment

According to the wavelength division multiplex transmission system of the third embodiment of the present invention also, advantages similar to those of the first embodiment can be obtained. In addition, through the third embodiment, the following advantages can be gained.

Similarly to the second embodiment, the configuration of the third embodiment also has provided an auxiliary optical channel card 13-t; but because this auxiliary optical channel card 13-t can accommodate variable wavelengths, it can, effectively, operate as an optical channel card in which a defect has occurred, and as a result there is no need to provide an auxiliary configuration in the optical receiving device 4, nor is it necessary that the WDM transmission network 1 accommodate an auxiliary wavelength component.

(C-4) Modification of the Third Embodiment

The system which was cited as a modification of the first embodiment also represents a modification of the third embodiment.

In the above explanation, a configuration in which there is one auxiliary variable-wavelength optical channel card in the optical transmission device was described; but a configuration in which a plurality of auxiliary variable-wavelength optical channel cards are provided is also possible. When providing such a plurality of auxiliary variable-wavelength optical channel cards, these optical channel cards may be configured such that the variable wavelength ranges are different for each. For example, the first auxiliary variable-wavelength optical channel card may accommodate wavelengths from λ1 to λm, and the second auxiliary variable-wavelength optical channel card may accommodate wavelengths from λ(m+1) to λn.

In the above, an auxiliary variable-wavelength optical channel card configured so as to employ a light source which itself is of variable wavelength was described; but of course the configuration to achieve variable wavelength is not limited to this. For example, a variable-wavelength optical channel card may be realized by having light sources for each wavelength component, and by selecting a signal from the plurality of light sources.

In the above, a configuration was described in which the optical transmission device is provided with an auxiliary variable-wavelength optical channel card and optical switch; but the optical receiving device may be provided with an optical switch and auxiliary variable-wavelength optical receiving card. That is, an optical signal with the wavelength component of an optical receiving card in which a defect has occurred may be applied to an auxiliary variable-wavelength optical receiving card via an optical switch, and the auxiliary variable-wavelength optical receiving card may receive and process the optical signal with that wavelength component.

(D) Fourth Embodiment

Next, a fourth embodiment of the wavelength division multiplex transmission system of the present invention is explained in detail, referring to the drawings.

The configurations of the optical transmission device and optical receiving device in the wavelength division multiplex transmission system of the fourth embodiment can be respectively represented by FIG. 4 and FIG. 6 of the above-described first embodiment.

However, in this fourth embodiment, the detailed internal configuration of each of the optical channel cards 13-1 to 13-n in the optical transmission device 3 differs from that of the first embodiment.

Figure 25:
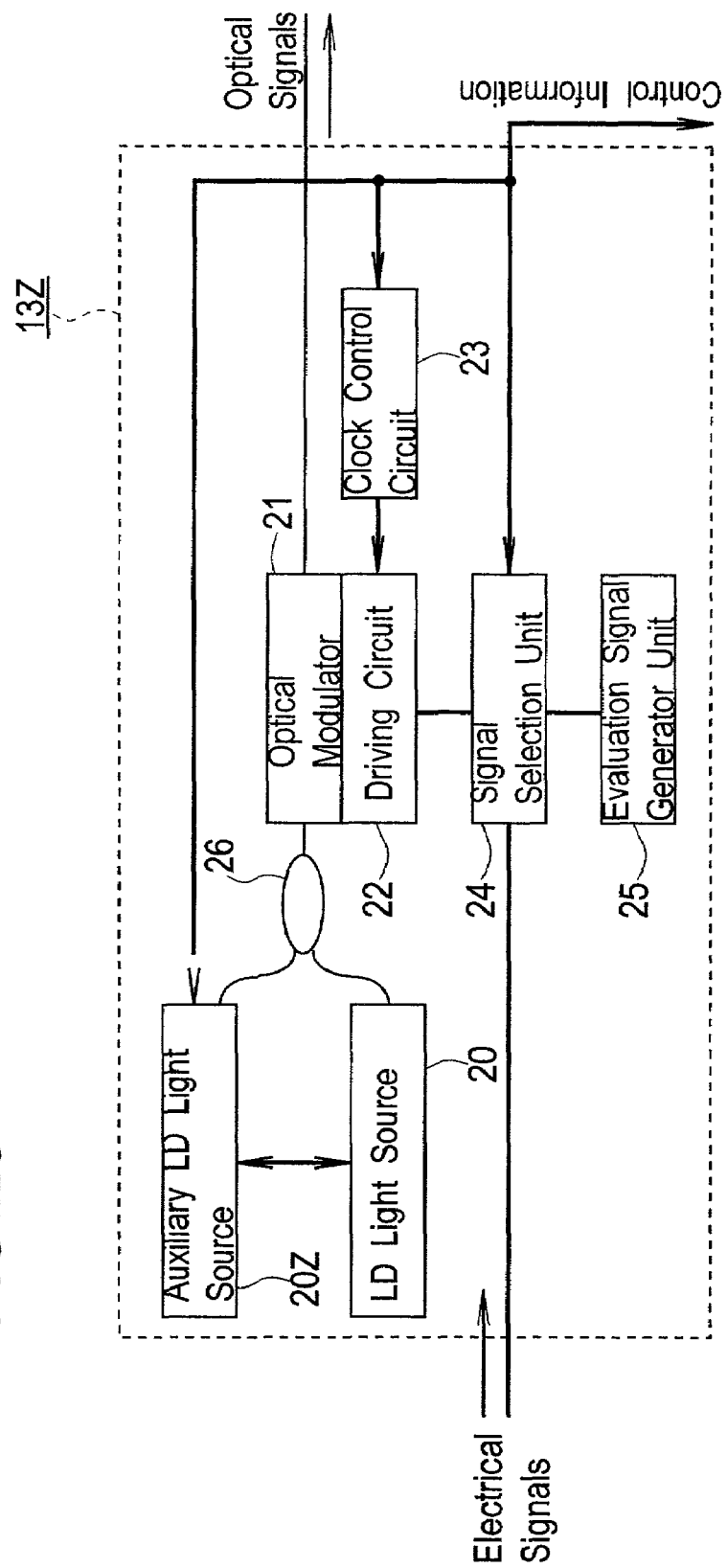
FIG. 25 is a block diagram showing an example of the detailed configuration of the optical channel card of a fourth embodiment of this invention.

FIG. 25 is a block diagram showing the detailed configuration of the optical channel cards 13Z (13-1 to 13-n) of the fourth embodiment; parts which are the same or corresponding in FIG. 5 for the first embodiment are assigned corresponding symbols.

In addition to the configuration of the optical channel card 13 of the first embodiment, the optical channel cards 13Z of the fourth embodiment are provided with an auxiliary LD light source 20Z and optical coupler 26.

Upon the occurrence of a defect in the LD light source 20, the auxiliary LD light source 20Z emits continuous-wave light at the same wavelength as the LD light source 20, in place of the LD light source 20. Here, the auxiliary LD light source 20Z is configured so as to incorporate functions for detection of the occurrence of defects in the LD light: source 20. For example, a configuration is assumed in which the interior of the auxiliary LD light source 20Z comprises a photosensitive element which monitors light emitted from the LD light source 20, so that when the optical power incident on the photosensitive element drops below a threshold value, it is assumed that a defect has occurred in the LD light source 20, and emission operation of the auxiliary LD light source 20Z is started.

The optical coupler 26 guides continuous-wave light emitted from the LD light source 20, or continuous-wave light emitted from the auxiliary LD light source 20Z, to the optical modulator 21.

Next, operation in the event that a defect occurs in the LD light source 20 of an optical channel card 13Z is briefly explained.

When a defect occurs in the LD light source 20 of an optical channel card 13Z, switching from the LD light source 20 to the auxiliary LD light source 20Z occurs, by means of the defect evasion function within the optical channel card 13Z. Either the transmission-side control signal processing part 17 or the network management device 6 is notified of it information during the period of this switching to the auxiliary LD light source 20Z, and during this switching interval, the signal distributor 12 is controlled to perform transmission without using the optical channel card 13Z. For example, prior to defect occurrence, switching is performed from a state in which a distributed transmission signal with n wavelength components is being sent, to a state in which a distributed transmission signal with n−1 wavelength components is being sent. Rather than redistribute data, for example, output from the signal distributor 12 to the optical channel card 13Z is halted.

Then, after confirming that switching to the auxiliary LD light source 20Z is completed, the system returns to the transmission state using the optical channel card 13Z. That is, switching is performed from a state in which distributed transmission signals are sent using n−1 wavelength components, to a state in which distributed transmission signals are sent using n wavelength components.

According to the wavelength division multiplex transmission system of the fourth embodiment of this invention also, advantages similar to those of the first embodiment can be obtained. In addition, through the fourth embodiment, the following advantages can be gained.

According to the fourth embodiment, simply by making a slight change to the internal configuration of optical channel cards, defects in optical channel cards can easily be accommodated. In actuality, the LD light source 20 is a part in the optical channel card which frequently malfunctions; by providing an auxiliary system, a satisfactory effect as a defect-avoidance function is obtained.

Further, through simple control to stop the output of distributed transmission signals from the signal distributor 12 during the interval of switching from the LD light source 20 to the auxiliary LD light source 20Z, and to resume the output of distributed transmission signals after the completion of switching, defects in light sources can be avoided.

In the above, the provision of LD light sources with an auxiliary system was explained; auxiliary systems may also be provided for the entirety of the optical processing system parts, including the LD light source and optical modulator.

(E) Fifth Embodiment

Next, a fifth embodiment of the wavelength division multiplex transmission system of the present invention is explained in detail, referring to the drawings.

(E-1) Configuration of the Fifth Embodiment

Figure 26:
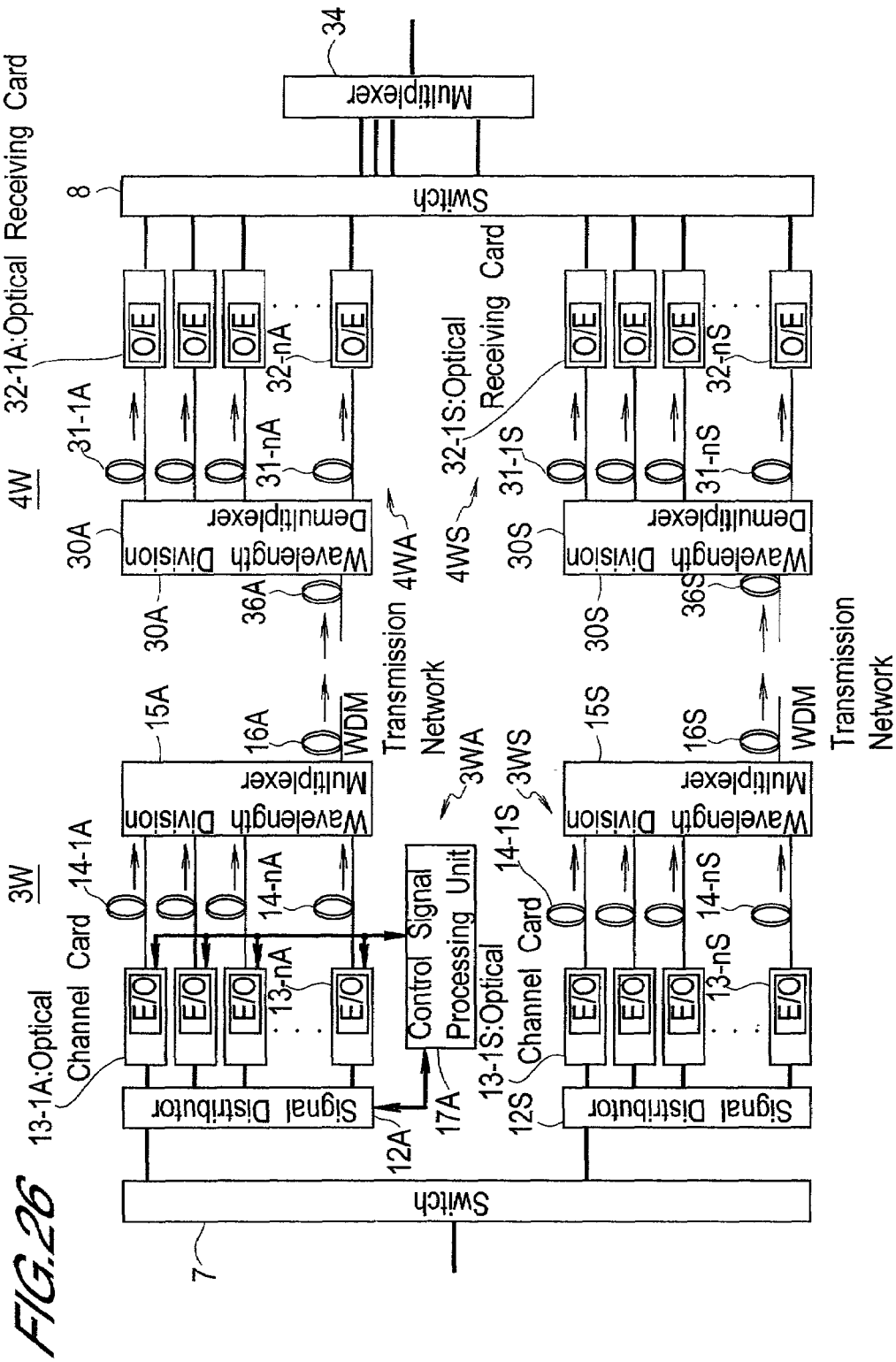
FIG. 26 is a block diagram showing the configuration of the wavelength division multiplex transmission system of a fifth embodiment of this invention.

FIG. 26 is a block diagram showing the configuration of principal components of the wavelength division multiplex transmission system of the fifth embodiment; parts which are the same or corresponding in drawings for previously-described embodiments are assigned corresponding symbols.

In FIG. 26, in the wavelength division multiplex transmission system of the fifth embodiment also, the optical transmission device 3W and optical receiving device 4W are it linked to each other through a WDM transmission network 1.

The optical transmission device 3W has an operating-system optical transmission unit 3WA, a standby-system optical transmission unit 3WS, and a system switch 7. Though omitted in FIG. 26, the optical transmission device 3W also has circuitry for interfaces with transmission terminals (one terminal, or a plurality thereof) at each layer.

The system switch 7 essentially provides transmission signals to the operating-system optical transmission unit 3WA.

When a defect occurs in the operating-system optical transmission unit 3WA sufficient to necessitate exchange, transmission signals are applied to the standby-system optical transmission unit 3WS, based on control information from a defect detection configuration, not shown, within the optical transmission device 3W, and the network management device, not shown, and similar.

The operating-system optical transmission unit 3WA has a signal distributor (so-called IMP) 12A, optical channel cards 13-1A to 13-nA, wavelength division multiplexer 15A, control signal processing unit 17A, and other components. In the case of the fifth embodiment, the operating-system optical transmission unit 3WA transmits such that all wavelength components pass through the same route, and in this respect the configuration is the same as in the prior art.

A difference between the operating-system optical transmission unit 3WA and the prior art is that the control signal processing part 17A monitors defects in the optical channel cards 13-1A to 13-nA, and, for defects in up to a prescribed number (for example, one) of optical channel cards, the signal distributor 12A is instructed to distribute the transmission signals distributed to cards in which defects have occurred to other optical channel cards. Hence the signal distributor 12A also differs from the prior art in that it supports such changes in signal distribution. Specifically, the control signal processing unit 17A functions as part of the defect detection means. That is, the control signal processing unit 17A monitors defects in the optical channel cards 13-1A, . . . , 13-nA, and makes judgments on the presence of defects based on the results of detection by externally provided sensors and other detection means.

On the other hand, the standby-system optical transmission unit 3WS functions when there occur defects in a number of optical channel cards in the operating-system optical transmission unit 3WA which exceeds the prescribed number.

The standby-system optical transmission unit 3WS has a signal distributor 12S, optical channel cards 13-1S to 13-nS, wavelength division multiplexer 15S, and other components. In the case of this fifth embodiment, the standby-system optical transmission unit 3WS is configured so as to send and process all wavelength components so as to pass through the same route, in a configuration similar to that of conventional optical transmission devices.

The optical receiving device 4W has an operating-system optical receiving unit 4WA, standby-system optical receiving unit 4WS, and system switch 8. Though omitted in FIG. 26, the optical receiving device 4W also has circuitry for interfaces with receiving terminals (not limited to one terminal) at each layer.

The system switch 8 selects the transmission signal received from the operating-system optical receiving unit 4WA and transmission signal received from the standby-system optical receiving unit 4WS, and sends it to the receiving terminal side, not shown; that is, it functions to switch between systems.

The operating-system optical receiving unit 4WA and standby-system optical receiving unit 4WS each have a wavelength division demultiplexer 30A, 30S, receiving cards 32-1A to 32-nA and 32-1S to 32-nS, and other components; it performs reception processing similar to that of conventional optical receiving devices. In the device shown in FIG. 26, the multiplexer unit 34 at the electrical signal stage is common to both systems. Of course, both systems may comprise separate multiplexer units as well.

(E-2) Operation of the Fifth Embodiment

In the wavelength division multiplex transmission system of the fifth embodiment, when a defect occurs in any of the optical channel cards of the operating-system optical transmission unit 3WA while in the transmission state using the operating-system optical transmission unit 3WA, the control signal processing unit 17A instructs the signal distributor 12A to distribute transmission signals to the other n−1 optical channel cards, and switching to a state of transmission of WDM transmission signals using n−1 wavelength components is performed.

Such processing is nearly the same as the processing shown in the flow chart of FIG. 11 for the first embodiment. This measure, in which the number of distributed transmission signals is changed, is employed when the number of optical channel cards in which defects have occurred is equal to or less than a prescribed number (for example, one).

When the number of defects in the optical channel cards 13-1A to 13-nA in the operating-system optical transmission unit 3WA exceeds the prescribed number, the system switch 7 causes transmission signals to be applied to the standby-system optical transmission unit 3WS, and switching to a state in which transmission is by the standby-system optical transmission unit 3WS is performed.

When the operating-system optical transmission unit 3WA is restored to the normal state through replacement of units and parts or similar, the system returns to the state of transmission by the operating-system optical transmission unit 3WA.

(E-3) Advantageous Results of the Fifth Embodiment

According to the wavelength division multiplex transmission system of the fifth embodiment of the present invention, even when a defect occurs in an optical channel card or cards in the operating-system optical transmission unit 3WA, if the number of defects is equal to or less than a prescribed number, the defects can be avoided without switching systems.

From the absence of a need for system switching, there is the subsidiary advantage that, for example, line breaks and other risks upon malfunction of the system switch can be avoided. Further, restoration to normal is possible through the replacement of the optical channel cards in which defects have occurred, so that only a small quantity of operating-system optical transmission units, which are large-size parts, must be stocked in consideration of the occurrence of defects.

In the case of adoption of a simple redundant configuration, if a defect occurs in an operating-system optical channel card, switching to the standby system is immediately performed; but if a defect has also occurred in a standby-system optical channel card (if duplicate defects occur), transmission is no longer possible. However, in the case of this fifth embodiment, even if a defect occurs in optical channel cards of the operating-system optical transmission unit 3WA, if [the number] is within the prescribed number, transmission by the operating system can be continued. In the case of this fifth embodiment, switching to the standby system is performed when a greater number of defects occurs, so that the configuration of this embodiment has a higher degree of redundancy, and satisfactory functions for defect avoidance.

(E-4) Modification of the Fifth Embodiment

Figure 27:
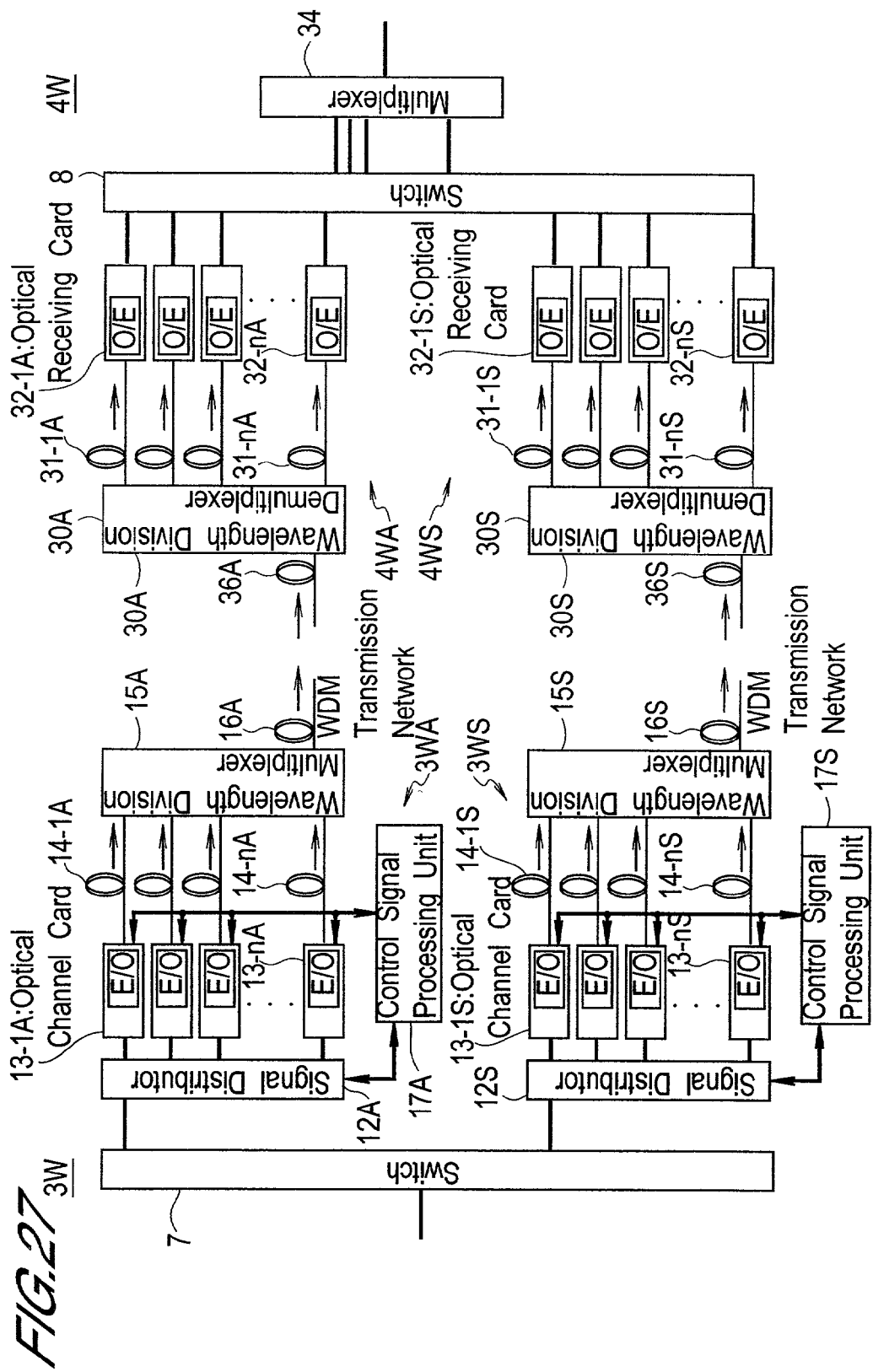
FIG. 27 is a block diagram showing the system configuration of a modification of the fifth embodiment of this invention; and, FIG. 28 is a block diagram showing the configuration of the wavelength division multiplex transmission system of a sixth embodiment of this invention.

In the above explanation, a system was described in which the operating-system optical transmission unit alone can execute transmission operation with a small number of wavelength components (number of channels); as shown in FIG. 27, a control signal processing unit 17S may be provided in the auxiliary-system optical transmission unit, enabling internal accommodation even when there are defects in a prescribed number or fewer of the optical channel cards 13-1S to 13-nS. Upon doing so, the degree of redundancy is further increased.

In the above explanation, a system was described with a configuration in which, at the time of occurrence of a defect in an internal optical channel card, the operating-system optical transmission unit can accommodate without executing system switching; conversely, the standby-system optical transmission unit alone may comprise such a configuration.

Further, in the above explanation a system was described in which all wavelength components pass through the same route between the optical transmission device and optical receiving device; but the technical concept in which routes are determined for each wavelength component, as in the above-described first through fourth embodiments, may also be introduced. In particular, it is desirable that the optical transmission device and optical receiving device of the above-described first through fourth embodiments be applied as the operating-system optical transmission unit and the operating-system optical receiving unit. By so doing, considerable SD transmission quality can be attained even if defects occur in some of the optical channel cards.

(F) Sixth Embodiment

Next, a sixth embodiment of the wavelength division multiplex transmission system of the present invention is explained in detail, referring to the drawings.

(F-1) Configuration of the Sixth Embodiment

Figure 28:
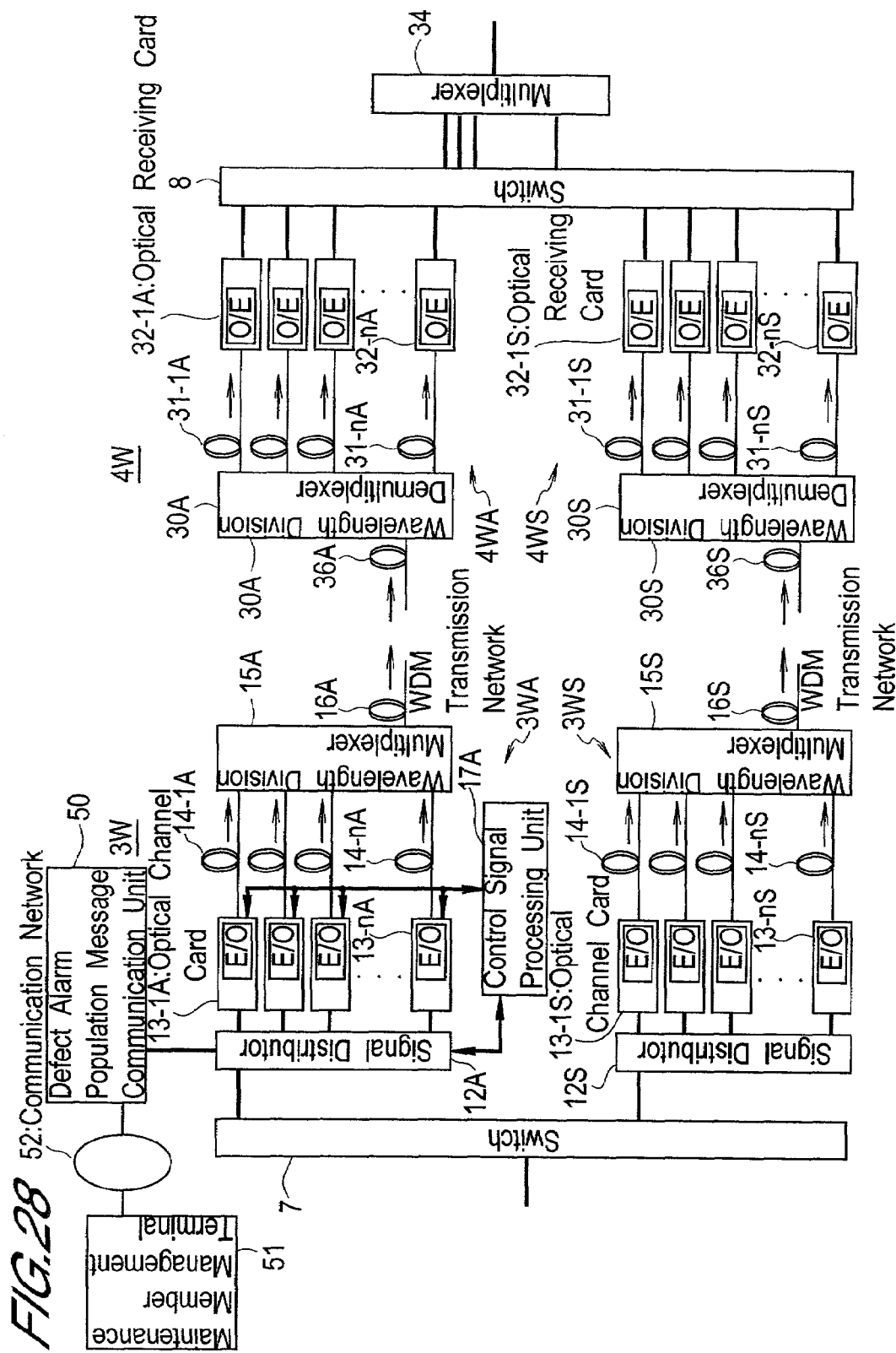

FIG. 28 is a block diagram showing the configuration of principal components of the wavelength division multiplex transmission system of the sixth embodiment; parts which are the same or corresponding in FIG. 26 for the fifth embodiment are assigned corresponding symbols.

Compared with the wavelength division multiplex transmission system of the above-described fifth embodiment, the wavelength division multiplex transmission system of the sixth embodiment differs in the configuration of the operating-system optical transmission unit 3WA. The defect alarm population message communication unit 50 of FIG. 28 constitutes the defect alarm message generation means.

In the case of the sixth embodiment, the operating-system optical transmission unit 3WA has, in addition to the configuration of the fifth embodiment, a defect alarm population message communication unit 50.

When a defect occurs in any of the optical channel cards 13-1A to 13-$n$A in the operating-system optical transmission unit 3WA, the defect alarm population message communication unit 50 sends, to the maintenance member management terminal 51, via a prescribed communication network 52 (which may be leased lines), a defect alarm population message containing specific information on the optical transmission device 3W and its optical channel cards.

Here, the defect alarm population message communication unit 50 may be realized as one function of the signal distributor 12A and control signal processing unit 17A.

The communication network 52 used for transmission of defect alarm population messages may be the WDM transmission network 1, or may be a communication network different from the WDM transmission network 1.

When the communication network 52 used for transmission of defect alarm population messages is the WDM transmission network 1, a dedicated wavelength component used for transmission of defect alarm population messages is established, and optical signals with this wavelength component are used to transmit defect alarm population messages. In this case, the defect alarm population message communication unit 50 comprises an optical channel card.

The maintenance member management terminal 51 is provided in, for example, a warehouse which stocks maintenance members, or a so-called vendor company or similar which has delivered the optical transmission device 3W. That is, the maintenance member management terminal 51 is provided in a company, division, or similar which is responsible for replacement of optical channel cards or other members in which defects occur.

The maintenance member management terminal 51 comprises an information processing device having functions to receive the above-described defect alarm population messages. When the maintenance member management terminal 51 receives a defect alarm population message, it performs the prescribed replacement processing (an example of replacement processing is explained in the section on operation).

(F-2) Operation of the Sixth Embodiment

In this sixth embodiment also, when a defect occurs in any of the optical channel cards 13-1A to 13-$n$A in the operating-system optical transmission unit 3WA, transmission signals are redistributed to the other optical channel cards excluding the optical channel card in which the defect has occurred, and are sent to the optical receiving device 4W.

By means of this operation, the defect alarm population message communication unit 50 sends to the maintenance member management terminal 51, via the communication network 52, a defect alarm population message containing specific information on the optical transmission device 3W and the optical channel card in which the defect has occurred.

At this time, the maintenance member management terminal 51 may perform processing sufficient to sound an alarm and display the defect alarm population message; or, it may confirm inventory of the optical channel card of the defect alarm population message, if there is a card in stock, set a reservation for its use, and if there is no card in stock, issue an instruction to manufacture or to order a card from another warehouse. Further, a maintenance worker may reference schedules or other data and establish a date and time for replacement operation.

Further, the maintenance member management terminal 51 may transfer the defect alarm population message to another device as necessary.

(F-3) Advantageous Results of the Sixth Embodiment

According to the sixth embodiment also, advantages similar to those of the fifth embodiment are obtained. In addition the following advantages can be obtained.

According to the sixth embodiment, the system is configured such that, upon occurrence of a defect in an optical channel card, the defect alarm population message communication unit 50 sends a defect alarm population message to the maintenance member management terminal 51, so that replacement of the optical channel card can be performed promptly. Further, to the extent that the defect alarm population message is sent in realtime, inventory management and manufacturing management are expedited, and smaller stock quantities can be anticipated.

(F-4) Modification of the Sixth Embodiment

In the above, a system was described in which a defect alarm population message communication unit 50 is provided in the operating-system optical transmission unit 3WA; a configuration may also be adopted in which, in addition to this, or in place of this, a defect alarm population message communication unit is provided in the standby-system optical transmission unit 3WS. A configuration may also be adopted in which a defect alarm population message communication unit is provided in the operating-system optical receiving unit 4WA and standby-system optical receiving unit 4WS. Further, a configuration may be adopted in which, in a system which does not adopt the redundant configuration of an operating system and standby system as in the first through fourth embodiments, a defect alarm population message communication unit is provided in the optical transmission device and optical receiving device. Of course, the member executing communication of defect alarm population messages is not limited to optical channel cards.

Further, a defect alarm population message communication unit may be provided in the transmission device and receiving device of a transmission system other than a wavelength division multiplex transmission system.

(G) Other Embodiments

In the above explanations of each embodiment of the present invention, a conception was explained in which there is one transmission terminal and one receiving terminal connected to the optical transmission device and the optical receiving device respectively; but a plurality of transmission terminals and receiving terminals may be connected as well. In this case, functions for switching of transmission signals between transmission terminals, and functions for switching received transmission signals between receiving terminals, may be performed by a signal distributor 12 incorporating buffer memory and a multiplexer 34.

If the combination is possible, a wavelength division multiplex transmission system may be constructed by combining the optical transmission device of one embodiment with the optical receiving device of a different embodiment.

In the above, the case of one-to-one communication between an optical transmission device and an optical receiving device was described; but the technical concepts of this invention can also be applied to one-to-N communication.

In the above, it was shown that communication from an optical transmission device to an arbitrary optical receiving device is possible; the technical concepts of the present invention can also be applied to cases in which the optical receiving device which engages in communication with the optical transmission device is fixed. In this case, when the optical transmission device and optical receiving device are inserted into a system, searches for optimal routes for each wavelength component and other processing may be performed.

The configuration of the WDM transmission network is arbitrary, and may be a star shape, loop shape, mesh shape, or multiple networks of a plurality of loops. Further, the optical transmission devices and optical receiving devices of each of the above embodiments may be provided at intermediate nodes. For example, the technical concepts of this invention can be applied even when Add/Drop circuits and optical cross-connect (OXC) devices exist at intermediate nodes.

In this way, according to the present invention, a wavelength division multiplex transmission system, in which transmission signals to be transmitted by an optical transmission device are converted into WDM signals distributed over a plurality of wavelength components and sent to the WDM transmission network, and WDM signals from the WDM transmission network are restored to the above transmission signals by an optical receiving device, has a wavelength component-specific route setting device which sets routes for transmission over the WDM transmission network for each wavelength component. Hence to the extent that all wavelength components are not on the same route, an improvement in transmission characteristics can be expected, and measures can be taken for each wavelength component to easily avoid defects in network elements and defects in the constituent components for each wavelength component of the optical transmission device and optical receiving device.

What is claimed is:

1. A wavelength division multiplex (WDM) transmission system, comprising:
   a WDM transmission network having a plurality of routes for transmitting optical signals;
   an optical transmission device to distribute transmission signals to be transmitted among a plurality of wavelength components, convert each of said transmission signals into WDM signals, and send each of said WDM signals to a specific route of the plurality of routes of said WDM transmission network;
   an optical receiving device to restore the WDM signals from the WDM transmission network into the transmission signals; and
   a wavelength component-specific route setting device to set routes based on evaluations of the routes for each of the wavelength components for transmission on said WDM transmission network.

2. A wavelength division multiplex transmission system according to claim 1, wherein
   said optical transmission device has a plurality of optical channel units, for each of said wavelength components, which convert distributed transmission signals into optical signals at a prescribed wavelength, and signal distribution means which divides transmission signals into a plurality of signals and distributes said signals among said optical channel units; and,
   said optical channel units for each wavelength component output optical signals which include labeling information for designating a route set for the own optical channel unit.

3. A wavelength division multiplex transmission system according to claim 2, wherein said optical transmission device has an auxiliary optical channel unit which, upon the occurrence of a defect in any of members of said optical channel units or said optical receiving units, functions in place of said optical channel unit to take charge of the wavelength component of the defective member, and said optical receiving device has an auxiliary optical receiving unit which functions in place of said optical receiving unit to take charge of the wavelength component of said defective member.

4. A wavelength division multiplex transmission system according to claim 3, wherein said auxiliary optical channel unit and said auxiliary optical receiving unit can change the wavelength which can be processed, and can be set to and operate at the wavelength component of said defective member.

5. A wavelength division multiplex transmission system according to claim 4, in which said optical receiving device comprises:
   an optical receiving unit which, when said WDM signals and said evaluation signals are input from said WDM transmission network, converts said WDM signals and evaluation signals into respective electrical signals at each wavelength, identifies these electrical signals obtained by conversion as WDM signals or evaluation signals, and outputs said WDM signals and evaluation signals; and,
   a delay compensation unit which compensates for delays, differing by route, of electrical signals at each wavelength.

6. A wavelength division multiplex transmission system according to claim 4, in which said optical channel unit is designed such that labeling information for sending on respective corresponding routes of WDM signals and evaluation signals is added to said WDM signals and said evaluation signals according to said distribution instructions, and said signals are output.

7. A wavelength division multiplex transmission system according to claim 3, wherein said auxiliary optical channel unit and said auxiliary optical receiving unit process a fixed wavelength component for auxiliary use.

8. A wavelength division multiplex transmission system according to claim 2, wherein, upon occurrence of a defect in any of members of said optical channel units or said optical receiving cards, said signal distribution means redistributes to other optical channel units the data quantity of the transmission signal distributed to the wavelength component of the defective member, according to empty band capacity for each wavelength component.

9. A wavelength division multiplex transmission system according to claim 1, wherein said optical receiving device has a plurality of optical receiving units for each of said wavelength components, which convert optical signals at the wavelength component into distributed transmission signals which are electrical signals, and a delay compensation unit which absorbs differences in the propagation delay of distributed transmission signals from each of said optical receiving units.

10. A wavelength division multiplex transmission system according to claim 1, wherein said wavelength component-specific route setting device has route-setting means which sets routes for each of said wavelength components for transmission through said WDM transmission network, according to route-specific transmission characteristics.

11. A wavelength division multiplex transmission system according to claim 10, wherein
said optical transmission device and said optical receiving device comprise constituent components of transmission characteristic evaluation means for sending, receiving, and evaluating evaluation signals to evaluate transmission characteristics of prescribed wavelength components for each route, and
said wavelength component-specific route setting device has route-setting means which sets routes for each of said wavelength components for transmission on said WDM transmission network, according to the evaluation results of said transmission characteristic evaluation means.

12. A wavelength division multiplex transmission system according to claim 11, wherein said wavelength component-specific route setting device has route-setting means which causes said transmission characteristic evaluation means to evaluate one or a plurality of empty routes for each wavelength component, and sets routes,
wherein said signal distribution means has data quantity determination means which determines data quantities for distribution to each wavelength component, according to evaluation results for set routes by said transmission characteristic evaluation means,
wherein said transmission system comprises a transmission quality management means which, during transmission of the WDM signals of said transmission signals, evaluate transmission quality for each wavelength component and control transmission speed for each wavelength component,
wherein the wavelength components which are the objects for evaluation of said transmission quality management means are wavelength components with an empty band capacity equal to or less than a prescribed value, and
wherein, during transmission of the WDM signals of said transmission signals, said signal distribution means comprises data quantity control means which controls the data quantities distributed to each wavelength component according to evaluation results for set routes by said transmission characteristic evaluation means.

13. A wavelength division multiplex transmission system according to claim 1, wherein, upon the occurrence of a defect in a network element in said WDM transmission network, said wavelength component-specific route setting device resets the routes for transmission in said WDM transmission network for all of said wavelength components on routes which have said network element as an element.

14. A wavelength division multiplex (WDM) transmission system, comprising:
a WDM transmission network having a plurality of routes for transmitting optical signals;
an optical transmission device which converts into wavelength division multiplex signals (WDM signals), each of the transmission signals input as electrical signals from a transmission terminal and sends said signals to said WDM transmission network;
an optical receiving device which converts said WDM signals received from said WDM transmission network into electrical signals, and regenerates said transmission signals for output to an output terminal; and
a network management device which is coupled to said optical transmission device, WDM transmission network and optical receiving device, and which manages functions for each of these devices; wherein
said optical transmission device and optical receiving device are designed to cooperate in generating transmission quality information for a plurality of routes within said WDM transmission network, with said transmission quality information provided to said network management device from said optical receiving device;
said network management device is designed to apply to said optical transmission device distribution instructions for distribution of each wavelength, to appropriate routes of the plurality of routes, of said WDM signals; and,
said optical transmission device is designed to distribute said transmission signals, in order to set routes by wavelength for said WDM signals according to distribution instructions, and output distributed transmission signals.

15. A wavelength division multiplex transmission system according to claim 14, in which said optical transmission device comprises:
a distributor to distribute said transmission signals, and
an optical channel unit, coupled with said distributor, to convert into WDM signals each of said distributed transmission signals,
wherein said optical channel unit comprises an evaluation signal output unit to output, to said route, evaluation signals used to generate said transmission quality information, and
wherein said optical channel unit comprises a WDM signal output unit which outputs WDM signals corresponding to distributed transmission signals in accordance with said distributed transmission signals.

16. A wavelength division multiplex transmission system according to claim 15, in which said optical receiving unit comprises an auxiliary optical receiving unit of fixed wavelength or of variable wavelength, in parallel with said optical receiving unit, and which is used when a defect occurs in said optical receiving unit.

17. A wavelength division multiplex transmission system according to claim 15, in which said optical channel unit comprises:
a WDM signal output unit which outputs WDM signals corresponding to distributed transmission signals in accordance with said distributed transmission signals;
an evaluation signal output unit which outputs, to said routes, evaluation signals used in generating said transmission quality information; and,
a signal selection unit which controls switching operation between said WDM signal output unit and said evaluation signal output unit.

18. A wavelength division multiplex transmission system according to claim 17, in which said network management device instructs said optical transmission device, WDM transmission network and optical receiving device to acquire empty route information for each wavelength and transmission quality information for empty routes, in response to a communication initiation notification from said optical transmission device, and which comprises optimal route selection means to determine the optimal route from these information, and transmission efficiency optimization means to determine the content of instructions for distribution of said WDM signals based on these information, wherein said transmission efficiency optimization means is designed to send, to said optical transmission device, WDM transmission network and optical receiving device, instructions to switch said WDM signal distributed transmission to said optimal routes according to said acquired information, together with said distribution instruction, wherein said transmission efficiency optimization means comprises:

a band-transmission efficiency evaluation unit which applies, to said optical transmission device, WDM transmission network and optical receiving device, instructions to evaluate band capacity usage and transmission efficiency for all wavelengths during transmission of said distributed transmission signals, and which obtains transmission quality information from evaluation signals captured from said optical receiving device; and a signal distribution determination unit which re-determines the details of distribution of said WDM signals, based on said transmission quality information, and wherein said transmission efficiency optimization means comprises:

route transmission quality adjustment means which makes a pass/fail judgment on transmission quality, based on said transmission quality information, and which controls the transmission speed of the WDM signal output unit of said optical channel unit, based on the judgment result.

19. A wavelength division multiplex transmission system according to claim 18, in which said transmission quality information comprises defect information which indicates that a defect has occurred in said optical channel unit or said optical receiving unit, and in which said transmission quality information comprises defect information which indicates that a defect has occurred in a network element within said WDM transmission network.

20. A wavelength division multiplex transmission system according to claim 15, in which said optical transmission device comprises an auxiliary optical channel unit of fixed wavelength or of variable wavelength, in parallel with said optical channel unit, and which is used when a defect occurs in said optical channel unit.

21. A wavelength division multiplex transmission system according to claim 20, in which said optical transmission unit comprises an optical switch which selects wavelengths of said WDM signals from the optical channel unit and auxiliary optical channel unit.

22. A wavelength division multiplex transmission system according to claim 14, in which said optical receiving device comprises:

an optical receiving unit which, when said WDM signals are input from said WDM transmission network, converts said WDM signals into electrical signals at each wavelength and outputs the electrical signals; and a delay compensation unit which compensates for delays, differing by route, of electrical signals at each wavelength.

* * * * *